(12) United States Patent
Vieira et al.

(10) Patent No.: US 12,726,283 B2
(45) Date of Patent: Sep. 1, 2026

(54) CONTROL OF REFERENCE SIGNALING FOR CALIBRATION OF A D-MIMO SYSTEM

(71) Applicant: Telefonaktiebolaget LM Ericsson (publ), Stockholm (SE)

(72) Inventors: Joao Vieira, Hjärup (SE); Muris Sarajlic, Malmö (SE); Sina Maleki, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 45 days.

(21) Appl. No.: 18/853,337

(22) PCT Filed: Mar. 2, 2023

(86) PCT No.: PCT/EP2023/055348
§ 371 (c)(1),
(2) Date: Oct. 1, 2024

(87) PCT Pub. No.: WO2023/194006
PCT Pub. Date: Oct. 12, 2023

(65) Prior Publication Data

US 2026/0039399 A1 Feb. 5, 2026

(30) Foreign Application Priority Data

Apr. 6, 2022 (SE) .................................... 2230103-0

(51) Int. Cl.
*H04B 17/11* (2015.01)
*H04B 7/0413* (2017.01)
*H04B 17/15* (2015.01)
*H04B 17/21* (2015.01)

(52) U.S. Cl.
CPC ........... *H04B 17/11* (2015.01); *H04B 7/0413* (2013.01); *H04B 17/191* (2023.05); *H04B 17/21* (2015.01)

(58) Field of Classification Search
CPC ... H04B 1/04; H04B 7/02; H04B 7/06; H04B 7/10; H04B 7/024; H04B 17/00;
(Continued)

(56) References Cited

U.S. PATENT DOCUMENTS

2012/0020396 A1* 1/2012 Hohne .................. H01Q 3/267 375/224
2012/0315891 A1* 12/2012 Takano .................. H04B 7/024 455/422.1

(Continued)

FOREIGN PATENT DOCUMENTS

WO 2021213658 A1 10/2021

OTHER PUBLICATIONS

International Search Report and Written Opinion dated Jun. 13, 2023 for International Application No. PCT/EP2023/055348 filed on Mar. 2, 2023, consisting of 12 pages.

(Continued)

*Primary Examiner* — Shawkat M Ali
(74) *Attorney, Agent, or Firm* — Weisberg I.P. Law, P.A.

(57) ABSTRACT

A method is disclosed for a control node for a distributed multiple-input multiple-output (D-MIMO) system comprising a plurality of access points. The method includes, during a calibration process with over-the-air reference signaling between access points, wherein the calibration process comprises a plurality of reference signaling occasions, and for at least one particular reference signaling occasion, dynamically selecting (among the plurality of access points and based on information obtained by measurements performed during a previous reference signaling occasion) a first access point, and controlling the first access point to act as a reference signal transmitter during the particular reference signaling occasion.

20 Claims, 5 Drawing Sheets

(58) Field of Classification Search
CPC ........ H04B 17/11; H04B 17/12; H04B 17/14; H04B 17/21; H04B 17/191; H04B 17/0413; H04L 1/02; H04L 5/14; H04L 25/0202; H04W 48/20; H04W 56/00; H04W 72/04; H04W 88/08
USPC ........ 375/219, 224, 260, 262, 267, 295, 316
See application file for complete search history.

(56) References Cited

U.S. PATENT DOCUMENTS

2018/0048361 A1* 2/2018 Kundargi .............. H04L 5/0051
2020/0244376 A1 7/2020 Wang et al.

OTHER PUBLICATIONS

Vieira, J. et al., Reciprocity calibration of Distributed Massive MIMO Access Points for Coherent Operation, 2021 IEEE 32nd Annual International Symposium on Personal, Indoor and Mobile Radio Communications (PIMRC), 2021, consisting of 5 pages.
3GPP TSG RAN WG1 RAN1 #89; R1-1708585, Title: OTA calibration for multi-TRP transmission; Source: Qualcomm Incorporated; Document for: Discussion/Decision, Agenda item: 7.1.2.1.7, Date and Location: May 15-19, 2017, Hangzhou, China, consisting of 6 pages.
Vieira, J. et al., Reciprocity Calibration for Massive MIMO: Proposal, Modeling, and Validation, IEEE Transactions on Wireless Communications, vol. 16, No. 5, May 2017, consisting of 15 pages.

* cited by examiner

CONTROL OF REFERENCE SIGNALING FOR CALIBRATION OF A D-MIMO SYSTEM

CROSS-REFERENCE TO RELATED APPLICATIONS

This application is a Submission Under 35 U.S.C. § 371 for U.S. National Stage Patent Application of International Application No.: PCT/EP2023/055348, filed Mar. 2, 2023 entitled "CONTROL OF REFERENCE SIGNALING FOR CALIBRATION OF A D-MIMO SYSTEM," which claims priority to Swedish Application No.: 2230103-0, filed Apr. 6, 2022, the entireties of both of which are incorporated herein by reference.

TECHNICAL FIELD

The present disclosure relates generally to the field of wireless communication. More particularly, it relates to calibration of distributed multiple-input multiple-output (D-MIMO) systems.

BACKGROUND

A distributed multiple-input multiple-output (D-MIMO) system typically comprises a control node and a plurality of access points. Typically, each access point (AP) has one or more (comparatively few, e.g., two) antenna elements, and the plurality of access points are spatially spread out to collectively provide a multi-antenna transceiver system.

There exist various approaches for calibration of multi-antenna transceiver systems. A first group of such approaches involves using an internal calibration network in a multi-antenna transceiver device, and a second group of such approaches involves over-the-air (OTA) signaling.

Approaches involving an internal calibration network typically entails high complexity in terms of hardware and/or software. For example, using an internal calibration network typically requires dedicated hardware (e.g., cables) for calibration, which is not needed in OTA-based calibration. Furthermore, internal calibration network approaches are typically not well suited for D-MIMO (due to the distributed nature of the access point deployment).

Approaches involving over-the-air signaling typically entails signaling overhead and/or suffers from being dependent on the radio channel.

Thus, there is a need for alternative approaches for calibration of a multi-antenna transceiver system.

Preferably, such approaches are suitable for calibration of a D-MIMO system. Also preferably, such approaches require less signaling overhead than over-the-air signaling approaches of the prior art. Furthermore, it is preferable that the negative impact of being dependent on the radio channel is mitigated. It is also beneficial if the calibration approach is equally applicable when the number of access points increases.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method of a control node for a distributed multiple-input multiple-output (D-MIMO) system comprising a plurality of access points. The method comprises—during a calibration process with over-the-air reference signaling between access points, wherein the calibration process comprises a plurality of reference signaling occasions, and for at least one particular reference signaling occasion—dynamically selecting (among the plurality of access points and based on information obtained by measurements performed during a previous reference signaling occasion) a first access point, and controlling the first access point to act as a reference signal transmitter during the particular reference signaling occasion.

In some embodiments, the dynamically selected first access point and the reference signal transmitter of the previous reference signaling occasion form respective ends of a bi-directional link.

In some embodiments, the measurements performed during the previous reference signaling occasion comprises Doppler measurements and/or signal strength measurements.

In some embodiments, the method further comprises—for the at least one particular reference signaling occasion—dynamically selecting (among the plurality of access points excluding the first access point) a second access point, and controlling the second access point to perform measurements during the particular reference signaling occasion.

In some embodiments, the method further comprises informing the second access point that the first access point acts as the reference signal transmitter during the particular reference signaling occasion.

In some embodiments, the method further comprises excluding a third access point from the dynamic selection of the second access point, responsive to that the information obtained by measurements performed during the previous reference signaling occasion indicates a signal transfer quality between the first access point and the third access point that falls on a side of a quality threshold that indicates low quality, and/or responsive to that channel transfer data is otherwise acquired during the calibration process for of the first and third access points.

In some embodiments, the method further comprises receiving, prior to a subsequent reference signaling occasion, information obtained by measurements performed during the particular reference signaling occasion.

In some embodiments, the dynamic selection of the first access point is further based on a system time parameter associated with a coherence assumption, and/or is further based on a movement estimation obtained by a sensor co-located with the first access point.

In some embodiments, the information obtained by measurements performed during the previous reference signaling occasion comprises a respective channel coherence time for the first access point relative to each of one or more other access points among the plurality of access points.

In some embodiments, the respective channel coherence time for the first access point is based on Doppler measurements performed by the first access point.

In some embodiments, the dynamically selected first access point fulfills a coherence condition relative the reference signal transmitter of the previous reference signaling occasion.

In some embodiments, the coherence condition comprises that a time interval between the previous reference signaling occasion and the particular reference signaling occasion is shorter than the channel coherence time for the first access point relative the reference signal transmitter of the previous reference signaling occasion.

In some embodiments, the dynamically selected first access point has a shortest time (among access points fulfilling the coherence condition at the particular reference signaling occasion), at the particular reference signaling occasion, until the coherence condition is no longer fulfilled In some embodiments, the information obtained by measurements performed during the previous reference signaling occasion comprises a respective reference signaling reliability for the first access point relative to each of one or more other access points among the plurality of access points.

In some embodiments, the respective reference signaling reliability for the first access point is based on signal strength measurements performed by the first access point.

In some embodiments, the dynamically selected first access point fulfills a reliability condition relative the reference signal transmitter of the previous reference signaling occasion.

In some embodiments, the reliability condition comprises that a received signal strength metric for the reference signal transmitter of the previous reference signaling occasion, as obtained at the first access point, exceeds a signal strength metric threshold.

In some embodiments, each access point of the plurality of access points is selected as the first access point at least once during the calibration process.

In some embodiments, the method further comprises determining an overall channel scenario status of the plurality of access points as stationary or variable, and performing the calibration process by dynamically selecting the first access point only when the overall channel scenario status is determined to be variable.

In some embodiments, the method further comprises, after the plurality of reference signaling occasions, determining calibration coefficients for the plurality of access points based on channel transfer data acquired by measurements performed during the plurality of reference signaling occasions.

A second aspect is a method of an access point for a distributed multiple-input multiple-output (D-MIMO) system comprising a plurality of access points. The method comprises—during a calibration process with over-the-air reference signaling between access points, wherein the calibration process comprises a plurality of reference signaling occasions, and for at least one particular reference signaling occasion—receiving a control message from a control node of the D-MIMO system prior to the particular reference signaling occasion and after a previous reference signaling occasion. The reception of the control message is responsive to dynamic access point selection among the plurality of access points based on information obtained by measurements performed during the previous reference signaling occasion. The control message instructs the access point to act as a reference signal transmitter during the particular reference signaling occasion, or perform measurements during the particular reference signaling occasion.

In some embodiments, the method further comprises transmitting reference signaling during the particular reference signaling occasion when the control message instructs the access point to act as the reference signal transmitter during the particular reference signaling occasion.

In some embodiments, the method further comprises performing the measurements when the control message instructs the access point to perform measurements during the particular reference signaling occasion.

In some embodiments, the method further comprises providing, to the control node, and prior to a subsequent reference signaling occasion, information obtained by measurements performed during the particular reference signaling occasion.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an apparatus for a control node for a distributed multiple-input multiple-output (D-MIMO) system comprising a plurality of access points. The apparatus comprises controlling circuitry configured to cause—during a calibration process with over-the-air reference signaling between access points, wherein the calibration process comprises a plurality of reference signaling occasions, and for at least one particular reference signaling occasion—dynamic selection (among the plurality of access points and based on information obtained by measurements performed during a previous reference signaling occasion) of a first access point, and control of the first access point to act as a reference signal transmitter during the particular reference signaling occasion.

A fifth aspect is a control node for a distributed multiple-input multiple-output (D-MIMO) system, wherein the control node comprises the apparatus of the fourth aspect.

A sixth aspect is an apparatus for an access point for a distributed multiple-input multiple-output (D-MIMO) system comprising a plurality of access points. The apparatus comprises controlling circuitry configured to cause—during a calibration process with over-the-air reference signaling between access points, wherein the calibration process comprises a plurality of reference signaling occasions, and for at least one particular reference signaling occasion—reception of a control message from a control node of the D-MIMO system prior to the particular reference signaling occasion and after a previous reference signaling occasion. The reception of the control message is responsive to dynamic access point selection among the plurality of access points based on information obtained by measurements performed during the previous reference signaling occasion. The control message instructs the access point to act as a reference signal transmitter during the particular reference signaling occasion, or perform measurements during the particular reference signaling occasion.

A seventh aspect is an access point for a distributed multiple-input multiple-output (D-MIMO) system, wherein the access point comprises the apparatus of the sixth aspect.

An eighth aspect is a distributed multiple-input multiple-output (D-MIMO) system comprising the control node of the fifth aspect and a plurality of access points according to the seventh aspect.

In some embodiments, any of the above aspects may additionally have features identical with or corresponding to any of the various features as explained above for any of the other aspects.

An advantage of some embodiments is that alternative approaches for calibration of a multi-antenna transceiver system are provided.

An advantage of some embodiments is that calibration approaches are provided which are suitable for D-MIMO.

An advantage of some embodiments is that less signaling overhead may be required than for other over-the-air signaling approaches.

An advantage of some embodiments is that more accurate calibration may be achieved than for other over-the-air signaling approaches.

An advantage of some embodiments is that negative impact of being dependent on the radio channel is mitigated.

An advantage of some embodiments is that the calibration approaches are applicable also when the number of access points increases.

Contrarily to other calibration schemes, some embodiments enable calibration of large-scale D-MIMO systems, wherein the time difference is relatively small between any two measurements which jointly define a bi-directional link. This typically results in calibration of large-scale D-MIMO systems, which is robust in relation to a time-varying channel between a pair of access points.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
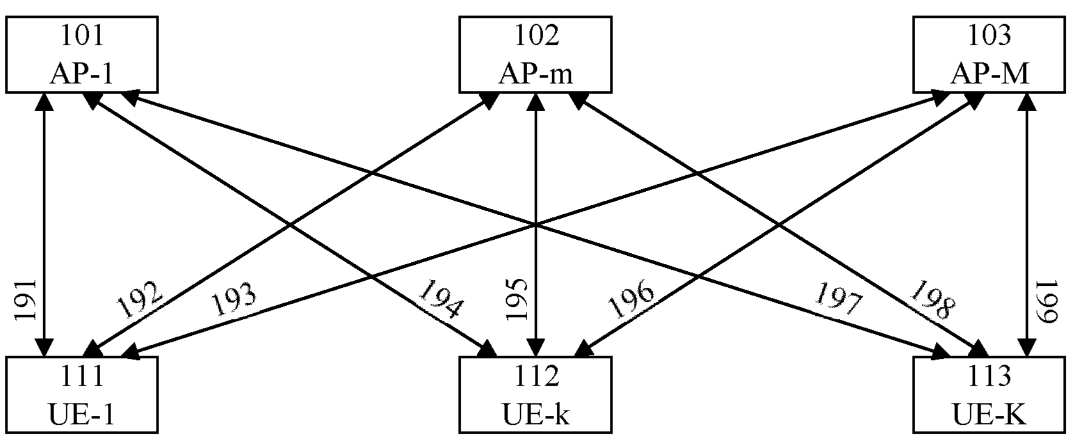
FIG. 1 is a schematic drawing illustrating an example calibration scenario according to some embodiments.

As already mentioned above, it should be emphasized that the term “comprises/comprising” (replaceable by “includes/including”) when used in this specification is taken to specify the presence of stated features, integers, steps, or components, but does not preclude the presence or addition of one or more other features, integers, steps, components, or groups thereof. As used herein, the singular forms “a”, “an” and “the” are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As already mentioned, a distributed multiple-input multiple-output (D-MIMO) system typically comprises a control node and a plurality of access points (APs). Sometimes, D-MIMO is also referred to as cell-free MIMO. D-MIMO may be used to provide good coverage and high capacity for areas with high traffic requirements (e.g., factory buildings, stadiums, office spaces, airports, etc.). Typically, several access points of a D-MIMO system are simultaneously active in communication between the D-MIMO system and a user device (e.g., a user equipment, UE); thereby bringing about benefits of multi-antenna transmission and/or reception.

For transmission by a D-MIMO system, the signal from each participating access point should preferably arrive (at the receiver of the user device) substantially in phase with the corresponding signals transmitted from the other participating access points (i.e., there should preferably be phase alignment between the received signals). When phase alignment can be achieved, the received signals will combine constructively at the receiver for phase-coherent reception. When the signals are not properly phase aligned at the receiver, destructive combination may occur, and the received signal might be too weak to enable reliable retrieval of the transmitted information.

To achieve phase alignment, it is desirable to acquire (for each participating access point) information regarding the channel between the access point and the user device. Channel information for joint coherent transmissions in the downlink (DL; i.e., from access points to user device) may be derived from uplink (UL) reference signaling (e.g., channel sounding) for channel reciprocity scenarios. This approach to phase alignment is typically referred to as reciprocity-based operation. One benefit of reciprocity-based operation is that the training overhead (signaling, processing, etc.) used to acquire channel information (e.g., channel state information, CSI) is relatively low. For example, the training overhead for reciprocity-based operation is lower than for approaches where the DL channel is learned via downlink reference signaling and associated uplink measurement reporting.

However, even when the propagation channel between an access point and a user device is reciprocal, the analog front-end circuitry of transceivers in the access point and the user device typically render the baseband-to-baseband channel non-reciprocal. Hence, to achieve proper performance (e.g., phase alignment) for reciprocity-based operation, the (typically non-reciprocal) impact that the transceivers in the access point and the user device have should preferably be compensated. This is commonly referred to as calibration.

As already mentioned, there exist various approaches for calibration of multi-antenna transceiver systems; some of which uses over-the-air (OTA) signaling.

According to some approaches, over-the-air (OTA) signaling between a user device and a multi-antenna base station is used to perform measurements, and estimate calibration coefficients for both the user device and the base station. A drawback with such approaches is that the user device is involved in the calibration process of the base station.

According to some approaches, the calibration process relating to transceivers in the access points is performed entirely at the access points (or infrastructure) side of the communication link. This can be achieved by over-the-air (OTA) signaling between some (typically all) pairs of transceivers (e.g., all pairs of antennas or all pairs of access points), and processing of the received signals to estimate calibration coefficients.

In the following, a description will be provided to exemplify a context for the calibration coefficient estimation. To this end, FIG. 1 schematically illustrates an example calibration scenario according to some embodiments.

For illustrative but non-limiting purposes, a narrowband MIMO link is assumed with M antenna ports at one end ("side A"; e.g., M single-antenna access points (AP-1, . . . , AP-m, . . . , AP-M) 101, 102, 103 of a D-MIMO system), and K antenna ports on the other end ("side B"; e.g., K user equipments (UE-1, . . . , UE-k, . . . , UE-K) 111, 112, 113). For distributed massive MIMO, it can be assumed that M»K. The different propagation channels (i.e., radio channels) between an AP and a UE are represented by 191, 192, 193, 194, 195, 195, 197, 198, 199 in FIG. 1, where 191 represents the propagation channel between AP-1 and UE-1, and so on.

It should be noted that the principles described herein for the above assumption are equally applicable for scenarios with multi-antenna AP(s) and/or multi-antenna UE(s).

Assuming a noiseless propagation channel, the M×K uplink channel $H_{UL}$ (e.g., representing an orthogonal frequency division multiplexing, OFDM, subcarrier or physical resource block, PRB), can be expressed as $H_{UL}=R_{AP}H\,T_{UE}$, where H is a matrix comprising all channels effects occurring between the UE transmitters and the AP receivers (e.g., propagation channel effects).

The matrix $$T_{UE}=\mathrm{diag}\{t_1^{UE}, \ldots , t_K^{UE}\}$$

is a diagonal matrix where each diagonal entry represents the complex gain of the transmitter in a respective one of the UEs, and the matrix $$R_{AP}=\mathrm{diag}\{r_1^{AP}, \ldots , r_M^{AP}\}$$

is a diagonal matrix where each diagonal entry represents the complex gain of the receiver in a respective one of the APs.

Within the same time/frequency coherence interval, the corresponding downlink channel can be expressed as $H_{DL}=R_{UE}H^T T_{AP}$, where $(.)^T$ denotes the transpose operator, the matrix $$T_{AP}=\mathrm{diag}\{t_1^{AP}, \ldots , t_M^{AP}\}$$

is a diagonal matrix where each diagonal entry represents the complex gain of the transmitter in a respective one of the APs, and the matrix $$R_{UE}=\mathrm{diag}\{r_1^{UE}, \ldots , r_K^{UE}\}$$

is a diagonal matrix where each diagonal entry represents the complex gain of the receiver in a respective one of the UEs.

It should be noted that, even when the matrix H is reciprocal (i.e., $H=H^T$), the end-to-end baseband channel is generally not reciprocal $$(\text{i.e., } H_{UL}\neq H_{DL}^T).$$

This is because the gains of the transceiver circuitries are generally not reciprocal (e.g., $R_{AP}\neq T_{AP}$, $R_{UE}\neq T_{UE}$) and thereby, the combined effect of $T_{AP}$ and $R_{UE}$ does not correspond to the combined effect of $T_{UE}$ and $R_{AP}$. Therefore, it may be cumbersome to directly achieve coherent downlink transmissions based on channel estimates obtained from uplink measurements.

An approach for achieving coherent downlink transmissions in such situations is based on that the access point (AP) side of the communication link has knowledge of a calibration matrix $C=\mathrm{diag}\{c_1, \ldots , c_M\}=T_{AP}(R_{AP})^{-1}$, up to an unknown non-zero complex-valued scaling factor $\alpha$. The diagonal entries of the calibration matrix represent calibration coefficients. Later herein, various embodiments will exemplify schemes for transmission of reference signalling that are suitable for acquisition of the calibration coefficients.

The uplink channel $H_{UL}$ can be estimated based on uplink measurements. Assuming that the APs apply joint zero-forcing (ZF) transmission in the downlink, the Moore-Penrose inverse of $$H_{UL}^T$$

ay be applied for the transmission; i.e., $$P=H_{UL}^*\left(H_{UL}^T H_{UL}^*\right)^{-1},$$

where $(\ )^*$ denotes element-wise complex conjugation. In this context, it should be noted that ZF transmission is only an example, and that the principles described herein are equally applicable for other types of transmission, with a corresponding general pre-coder matrix P which is based on the uplink channel $H_{UL}$.

Since P is based on the uplink channel, it is not matched to the (non-reciprocal) downlink channel $H_{DL}$. Therefore, it is not preferable to use it directly as a downlink pre-coder. To this end, the respective pre-coded signals of each AP may be multiplied by a corresponding entry of $(\alpha C)^{-1}$. More specifically, the pre-coded signal at AP m may be multiplied by $1/(\alpha c_m)$ for each AP; i.e., $1\leq m\leq M$. Then, the effective downlink channel can be expressed as $$\begin{aligned} H_{DL}' &= H_{DL}\alpha^{-1}C^{-1}P \\ &= H_{DL}\alpha^{-1}C^{-1}H_{UL}^*\left(H_{UL}^T H_{UL}^*\right)^{-1} \end{aligned}$$

-continued $$= H_{DL}\alpha^{-1}C^{-1}R_{AP}^{*}H^{*}T_{UE}^{*}\left(T_{UE}H^{T}|R_{AP}|^{2}H^{*}T_{UE}^{*}\right)^{-1}$$
$$= H_{DL}\alpha^{-1}T_{AP}^{-1}|R_{AP}|^{2}H^{*}T_{UE}^{*}\left(T_{UE}H^{T}|R_{AP}|^{2}H^{*}T_{UE}^{*}\right)^{-1}$$
$$= H_{DL}\alpha^{-1}(T_{AP})^{-1}\left(H^{T}\right)^{\dagger}(T_{UE})^{-1}$$
$$= \alpha^{-1}R_{UE}H^{T}T_{AP}(T_{AP})^{-1}\left(H^{T}\right)^{\dagger}(T_{UE})^{-1}$$
$$= \alpha^{-1}R_{UE}(T_{UE})^{-1},$$

which is a diagonal matrix with unknown diagonal entries. The operator $(.)^{\dagger}$ denotes the Moore-Penrose inverse, and $|.|^2$ denotes element-wise squared absolute value.

The unknown diagonal entries of $H'_{DL}$ can be estimated by downlink measurements (e.g., based on a single downlink reference signal, which is beamformed towards all UEs using $\alpha^{-1}C^{-1}P$). Thus, K uplink reference signals (one per UE; to perform phase measurements for coherence) combined with one downlink reference signal (to determine the diagonal entries of $H'_{DL}$) are sufficient to achieve coherent reciprocity-based transmissions when the calibration coefficients $c_1, \ldots, c_M$ are known (except for the scaling factor $\alpha$). Thereby, the overhead signaling can be reduced compared to other approaches for DL channel estimation.

Thus, knowledge of the matrix C (up to an unknown non-zero complex-valued scaling factor $\alpha$) enables coherent downlink transmission with no (or at least comparatively little) interference between UEs; over what is effectively a calibrated uplink/downlink channel. Therefore, it may be desirable to properly estimate the calibration coefficients; i.e., the diagonal entries of the calibration matrix C.

According to some approaches, the calibration coefficients are estimated by sounding the M AP transceivers one-by-one, in a pre-defined order (by transmitting a sounding signal from the sounding transceiver and performing measurements on the sounding signal as received by the other (M−1) transceivers. These approaches require (at least) $M^2-M$ measurements to be performed for estimation of M diagonal entries of C.

A problem with these approaches is that the propagation channel may change between measurements performed for one direction of a link between two APs and measurements performed for the other direction of the link between the two APs. This is particularly problematic when the time duration between the measurements is relatively long (e.g., larger than the coherence time of the channel). Such changes in the propagation channel may result in inferior calibration and/or extra measurements.

As will be exemplified later herein, it may be beneficial in this respect to apply a dynamic order for sounding the APs (instead of a pre-defined order). For example, the order may be dynamically adapted to avoid that the propagation channel changes (or at least avoid that the propagation channel changes too much) between measurements performed for the two different directions of a link between two APs.

One approach for determining the scaled calibration matrix $\alpha C$ can be understood by regarding the scaling factor $\alpha$ to be equal to $1/c_m$ for some m (e.g., $\alpha=1/c_1$, which yields $\alpha C=\mathrm{diag}(1, c_2/c_1 \ldots, c_M/c_1)$. The diagonal elements of the calibration matrix thus scaled may be estimated by performing bi-directional measurements between the $m^{th}$ access point and each of the other access points. This approach may be termed direct calibration.

For example, a bi-directional measurement between the $1^{st}$ access point and the $2^{nd}$ access point may be performed to estimate the diagonal element $c_2/c_1$; for calibration of the $2^{nd}$ access point in relation to the $1^{st}$ access point. A noise free version of this bi-directional measurement may be represented by $y_{2,1}=r_2\ h_{2,1}t_1$ and $y_{1,2}=r_1\ h_{1,2}t_2$, where $T_{AP}=\mathrm{diag}\{t_1, \ldots, t_M\}$, $R_{AP}=\mathrm{diag}\{r_1, \ldots, r_M\}$, $h_{1,2}$ represents the propagation channel from the $1^{st}$ access point and the $2^{nd}$ access point, and $h_{2,1}$ represents the propagation channel from the $2^{nd}$ access point and the $1^{st}$ access point.

When the two measurements, which comprise a bi-directional measurement, are performed closely in time (e.g., within a time duration which is smaller than the coherence time of the channel), the propagation channel can be assumed to be reciprocal (i.e., $h_{2,1}=h_{1,2}$), which implies that the instantaneous phase of the propagation channels $h_{2,1}$ and $h_{1,2}$ is the same during both measurements. Assuming the calibration coefficient for the $1^{st}$ access point to be equal to 1, the calibration coefficient for the $2^{nd}$ access point can be determined based on the two measurements as $y_{1,2}/y_{2,1}=r_1h_{1,2}t_2/r_2\ h_{2,1}t_1=r_1t_2/r_2\ t_1=c_2/c_1$. This matches the second diagonal entry of $\alpha C=\mathrm{diag}\{\mathbf{1}, c_2/c_1 \ldots, c_M/c_1\})$ when $\alpha=1/c_1$.

It should be noted that, even though $h_{1,2}$ and $h_{2,1}$ cancel each other in the expression of the calibration coefficient, the path loss of the corresponding propagation channels typically need to be low enough to enable proper accuracy of the measurements.

An alternative to direct calibration is indirect calibration, where calibration is achieved between two access points via bi-directional measurements that involve one or more other (intermediate) access points. This may be beneficial, for example, if the path loss of the propagation channels between two access points is so high that proper accuracy of the measurements cannot be achieved.

For example, the diagonal element $c_2/c_i$ may be estimated via a bi-directional measurement between the $1^{st}$ access point and an $m^{th}$ intermediate access point, combined with a bi-directional measurement between the $m^{th}$ access point and the $2^{nd}$ access point. A noise free version of these bi-directional measurements may be represented by $y_{m,1}=r_m\ h_{m,1}t_1$, $y_{1,m}=r_1\ h_{1,m}t_m$, $y_{2,m}=r_2\ h_{2,m}t_m$, and $y_{m,2}=r_m\ h_{m,2}t_2$. Assuming the propagation channels to be reciprocal for each bi-directional measurement, the calibration coefficient for the $2^{nd}$ access point can be determined as $y_{m,2}y_{1,m}/y_{2,m}Y_{m,1}=r_m\ h_{m,2}t_2r_1\ h_{1,m}t_m/r_2\ h_{2,m}t_mr_m\ h_{m,1}t_1=r_1\ t_2/r_2\ t_1=c_2/c_1$. Extension to more than one intermediate access point is also possible.

Figure 2:
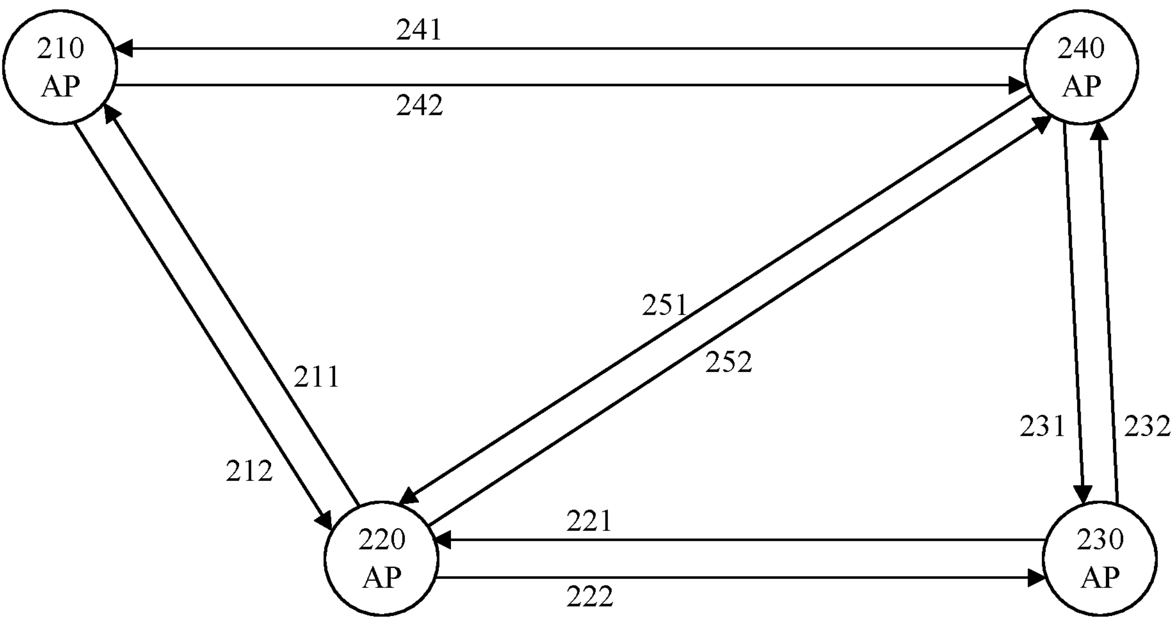
FIG. 2 is a schematic drawing illustrating example bi-directional links for calibration according to some embodiments.

FIG. 2 schematically illustrates some example bi-directional links for calibration according to some embodiments. The bi-directional links relate to a plurality of access points (AP) 210, 220, 230, 240. For example, the plurality of access points may be access points of a D-MIMO system.

FIG. 2 shows a bi-directional link 211, 212 between AP 210 and AP 220, a bi-directional link 221, 222 between AP 220 and AP 230, a bi-directional link 231, 232 between AP 230 and AP 240, a bi-directional link 241, 242 between AP 240 and AP 210, and a bi-directional link 251, 252 between AP 220 and AP 240. No bi-directional link is shown between AP 230 and AP 210; e.g., to illustrate high path loss between AP 230 and AP 210.

Calibration between AP 210 and AP 240 may be achieved by direct calibration, by performing a bi-directional measurement for the bi-directional link 241, 242 between AP 210 and AP 240.

Furthermore, calibration between AP 210 and AP 240 may be achieved by indirect calibration. For example, calibration between AP 210 and AP 240 may be achieved by performing two bi-directional measurements; for the bi-directional link 211, 212 between AP 210 and AP 220 and for the bi-directional link 251, 252 between AP 220 and AP 240.

Alternatively, calibration between AP 210 and AP 240 may be achieved by performing three bi-directional measurements; for the bi-directional link 211, 212 between AP 210 and AP 220, for the bi-directional link 221, 222 between AP 220 and AP 230, and for the bi-directional link 231, 232 between AP 230 and AP 240.

It should be noted that, when the bi-directional measurement approach is used (for either direct or indirect calibration), it is only the pair of measurements that relate to the same bi-directional link and jointly comprise a bi-directional measurement that need to be performed closely enough in time (e.g., within a time duration which is smaller than the coherence time of the channel) to utilize the propagation channel reciprocity assumption.

In the following, embodiments will be described where the order of reference signal transmission for calibration is dynamically determined among the access points. Such approaches enable the pair of measurements that relate to the same bi-directional link to be performed closely enough in time (preferably within a time duration which is smaller than the coherence time of the channel) to utilize the propagation channel reciprocity assumption. This may be particularly relevant to systems with distributed antennas (e.g., D-MIMO systems). In systems with distributed antennas, there is typically no (or relatively weak) mutual coupling between the antennas. Hence, the channels between the antennas are not dominated by one or more relatively strong and time-invariant channel propagation path(s), which are typically provided by mutual coupling (e.g., for systems with co-located antennas). Instead, the channels between the antennas may comprise (e.g., be dominated by) one or more significant time-variant channel propagation path(s), which renders a pre-determined reference signal transmission order among the access points unsuitable for calibration.

In contrast to scenarios with static channel conditions, the order of reference signal transmission and corresponding measurements for calibration may be very important in scenarios with non-static channel conditions (e.g., for large-scale distributed MIMO systems where the propagation channel between distributed APs can vary significantly over time). For example, non-static channel conditions may arise when one or more of the APs are non-stationary (e.g., generally mobile, or subject to small movements such as vibrations or similar) and/or when the channel is affected by one or more non-stationary objects (e.g., reflection and/or obstruction objects).

As will be elaborated on further below, the order at which APs transmit reference signaling may be computed on-the-fly, and may be adapted based on information obtained by measurements performed during a previous reference signaling occasion. Thereby, the process can adapt itself to the current channel conditions.

In some embodiments, Doppler measurements may be performed by a plurality of APs (AP-y) when one AP (AP-x) acts as reference signal transmitter, and the Doppler measurements may be used to estimate a respective coherence time for each measuring AP-y. The estimated coherence times may then be used to determine the order in which the plurality of AP-y should act as reference signal transmitter to enable AP-x to complete the bi-directional measurements. For example, an AP-y with relatively short coherence time (e.g., large Doppler spread) could preferably, considering only bi-directional links for AP-x, act as reference signal transmitter sooner than an AP-y with relatively longer coherence time.

In some embodiments, received signal strength measurements may be performed by a plurality of APs (AP-y) when one AP (AP-x) acts as reference signal transmitter, and the received signal strength measurements may be used to estimate a respective reliability of the link to AP-x for each measuring AP-y. The estimated reliabilities may then be used to determine which of the plurality of AP-y should act as reference signal transmitter to enable AP-x to complete the bi-directional measurements. For example, an AP-y with relatively low reliability (e.g., low received signal strength) could preferably, considering only bi-directional links for AP-x, be disregarded and not act as reference signal transmitter. According to some embodiments, the reliability may be quantized into binary values ("reliable" and "unreliable"). The reliability may be set to "reliable" when the received signal strength exceeds a signal strength metric threshold value, and the reliability may be set to "unreliable" when the received signal strength does not exceed the signal strength threshold value. For example, the signal strength threshold value may correspond to a lowest propagation channel path loss where proper accuracy of the measurements cannot be achieved.

According to some embodiments, a signaling protocol for reciprocity calibration between a plurality of APs is provided, comprising over-the-air transmission of reference signals for calibration measurements. The protocol includes dynamic selection of the order in which APs are to act as reference signal transmitter, wherein the selection is based on information obtained by previous reference signaling measurements.

For example, the selection of the order may comprise letting the maximum time difference between two measurements which jointly comprise a bi-directional measurement (i.e., back-and-forward measurements between an AP pair) be smaller than a time threshold.

The time threshold may, for example, be a coherence time threshold. The time threshold may be a collective time threshold for all bi-directional links (e.g., corresponding to an average, or maximum, coherence time among the links), or a link-specific time threshold (e.g., corresponding to the coherence time of the link). The coherence time of a link can be estimated based on Doppler measurements for the link obtained during previous reference signaling measurements.

Alternatively or additionally, the time threshold may be a system parameter threshold (e.g., corresponding to a system time parameter, such as an OFDM slot in Fifth Generation New Radio, 5G NR).

Yet alternatively or additionally, the time threshold may be a movement threshold. For example, sensor data indicating physical movement of an AP (e.g., velocity data, acceleration data, etc.) may be used to determine the shortest time duration in which physical movement of an AP can render the channel non-reciprocal.

The time threshold may, in some embodiments, be a combination of coherence time threshold and/or system parameter threshold and/or movement threshold.

The signaling protocol may also include excluding APs from the selection to transit reference signaling under some circumstances. For example, when a received signal strength of previous reference signaling measurements is lower than a signal strength threshold value, the corresponding bi-directional link may be considered as unreliable and no further reference signal transmission should be performed with the purpose to perform measurements for the unreliable link.

Contrarily to other calibration schemes, some embodiments enable proper calibration of large-scale distributed MIMO systems because time intervals between measurements for any two measurements which jointly comprise a bi-directional measurement are kept short enough to justify the reciprocity assumption being applied for the non-stationary channel. Thus, calibration of large-scale distributed MIMO systems is enabled that is robust against variations in the channels between APs during the entire calibration process.

Figure 3:
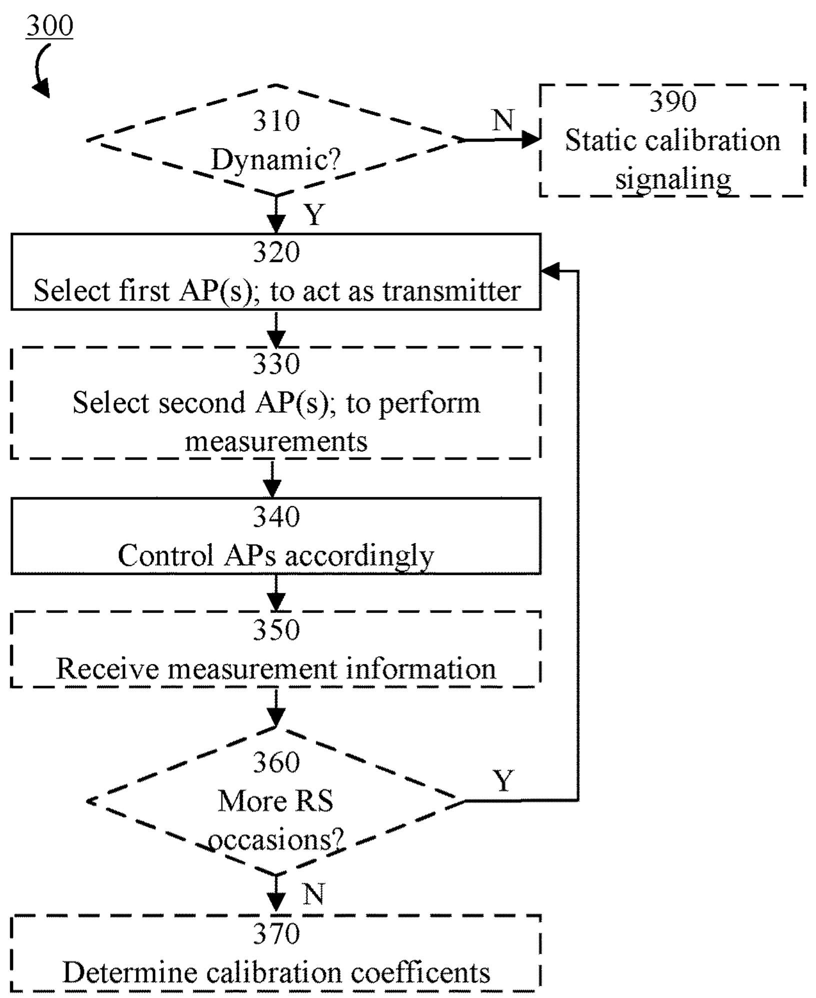
FIG. 3 is a flowchart illustrating example method steps according to some embodiments.

FIG. 3 illustrates an example method 300 according to some embodiments. The method 300 is performed by a control node for (e.g., of) a D-MIMO system comprising a plurality of access points. The plurality of access points may be all access points of the D-MIMO system, or a subset thereof.

The method 300 is performed during a calibration process with over-the-air reference signaling between access points. The calibration process comprises a plurality of reference signaling occasions. During each reference signaling occasion, one (or more) of the plurality of access points may act as a reference signal transmitter, and at least one (e.g., some, or all) of the other access points of the plurality may perform measurements.

In some embodiments, the plurality of access points is variable between different calibration processes. For example, an access point with stable transceiver response variations (e.g., time drift) may be included in the plurality of access points more seldom than an access point with instable transceiver response variations (e.g., time drift).

For a particular reference signaling occasion, the method 300 comprises dynamically selecting a first access point among the plurality of access points, as illustrated by step 320. The selection is based on information obtained by measurements performed during a previous reference signaling occasion. In some embodiments, the selection is based on information obtained by measurements performed during several (e.g., all, or the most recent) previous reference signaling occasions.

During each particular reference signaling occasion, at least one (e.g., exactly one, or more than one) first access point is typically selected to act as reference signal transmitter. When more than one first access point is selected for the same reference signaling occasion, the selected first access points may use different reference signals to enable discrimination between reference signals transmitted by different first access points.

Typically, the dynamically selected first access point and the reference signal transmitter of the previous reference signaling occasion form respective ends of a bi-directional link. Thus, the first access point may be selected to act as a reference signal transmitter with the purpose of completing the bi-directional measurement for the link between the first access point and the access point that acted as reference signal transmitter during the previous reference signaling occasion.

For the particular reference signaling occasion, the method 300 may also comprise dynamically selecting a second access point among the plurality of access points (excluding the first access point), as illustrated by optional step 330.

During each particular reference signaling occasion, at least one (e.g., more than one) second access point is typically selected to perform measurements. In some embodiments, all access points except the first access point(s) are selected as second access points to perform measurements.

In some embodiments, a (e.g., one or more) third access point is excluded from the dynamic selection of the second access point for a reference signaling occasion. Thus, the third access point is neither acting as reference signal transmitter, nor performing measurements, during the reference signaling occasion. It may be possible to turn off the third access point, or let it enter a low activity operation mode, during the reference signaling occasion (e.g., to reduce power consumption). Alternatively, the third access point may be used for communication signaling during the reference signaling occasion.

The exclusion of the third access point may be responsive to that the information obtained by measurements performed during the previous reference signaling occasion indicates a signal transfer quality between the first access point and the third access point that falls on a side of a quality threshold that indicates low quality (e.g., the link between the first and third access points being regarded as unreliable). For example, the information obtained by measurements performed during the previous reference signaling occasion may indicate a path loss between the first access point and the third access point that is higher than a path loss threshold, and/or may indicate a received signal strength that is lower than a signal strength threshold.

Using the example illustrated in FIG. 2, this exclusion principle may be illustrated by assuming that measurements performed by AP 230 during a previous reference signaling occasion when AP 210 acted as reference signal transmitter indicate that the link between AP 210 and 230 is unreliable (and consequently not shown in FIG. 2). When AP 230 is (later) selected as first access point to act as reference signal transmitter, there is no use in letting AP 210 perform measurements during that reference signaling occasion since the link is unreliable. Hence, AP 210 may be seen as a third access point and may be excluded from selection as second access point.

Alternatively or additionally, the exclusion of the third access point may be responsive to that channel transfer data is otherwise acquired (e.g., by measurements performed during earlier reference signaling occasions and/or performed during the particular reference signaling occasion) during the calibration process for calibration of the first and third access points. Thus, if enough channel transfer data for calibration between the first and third access point has already been acquired (or will be acquired during the particular reference signaling by measurements performed by other access points than the third access point), no measurements need to be performed by the third access point while the first access point acts as reference signal transmitter. Put differently; if calibration measurements otherwise performed during the calibration process are sufficient for determination of a relation between calibration coefficients of the first and third access points, no measurements need to be performed by the third access point while the first access point acts as reference signal transmitter.

This exclusion principle may be expressed as it being sufficient for calibration of between two access points that one "path" of one or more bi-directional links between them is measured. Hence, if measurements for one such "path" have already been (or will be) performed, further measurement cannot be motivated with the purpose to provide another "path" between those two access points.

Using the example illustrated in FIG. 2, this exclusion principle may be illustrated by assuming that measurements corresponding to links 242, 212, 211, and 252 have been performed during two previous reference signaling occasions; when AP 210 and AP 220 acted as reference signal transmitters. When AP 240 is (later) selected as first access point to act as reference signal transmitter, there is no use in letting both AP 210 and AP 220 perform measurements during that reference signaling occasion. If, for example, AP 210 is selected to perform measurements when AP 240 acts as reference signal transmitter, measurements corresponding to link 241 are performed. Then, the bi-directional links 241, 242 and 211, 212 provide a "path" between AP 220 and AP 240 and there is no need to let AP 220 perform measurements to complete the bi-directional link 251, 252. Hence, AP 220 may be excluded from selection as second access point.

The method 300 also comprises controlling the first access point to act as a reference signal transmitter during the particular reference signaling occasion, as illustrated by step 340. In some embodiments, step 340 may also comprise controlling the second access point to perform measurements during the particular reference signaling occasion and/or informing the second access point that the first access point acts as the reference signal transmitter during the particular reference signaling occasion.

Step 340 may be implemented by conveying one or more control messages for each reference signaling occasion. For example, a single control message intended for all of the access points may be indicative of which access point(s) are to act as reference signal transmitter, and may possibly be indicative also of which access point(s) are to perform measurements. Alternatively or additionally, dedicated control message(s)—each intended for a respective access point—may be indicative of whether or not the access point is to act as reference signal transmitter, and may possibly also be indicative of whether or not the access point is to perform measurements. In some embodiments, an indication to perform measurements may be implicit.

For example, an access point that is not instructed to act as a reference signal transmitter may be regarded as implicitly instructed to perform measurements.

The method 300 may further comprise receiving (from one or more—typically all—of the second access point(s)) information obtained by measurements performed during the particular reference signaling occasion, as illustrated by optional step 350. The information is typically received prior to a subsequent reference signaling occasion.

The dynamic selection (steps 320, 330), the corresponding AP control (step 340), and the information reception (step 350) may be performed for each (or at least some) of the reference signaling (RS) occasions, as illustrated by optional step 360.

When there are more reference signaling occasions in the calibration process (Y-path out of step 360), the dynamic access point selection continues, and each reference signaling occasion provides measurement information that can be used for the upcoming selections.

When there are no more reference signaling occasions in the calibration process (N-path out of step 360), the method 300 proceeds to optional step 370, where calibration coefficients are determined for the plurality of access points based on channel transfer data acquired by measurements performed during the plurality of reference signaling occasions.

The measurements performed during a reference signaling occasion typically comprises both control measurements and calibration measurements.

The control measurements result in information that can be used for the dynamic selection of upcoming reference signaling occasion (e.g., via the reception in step 350). Thus, information obtained by control measurements performed during the particular reference signaling occasion becomes—for a subsequent reference signaling occasion—information obtained by measurements performed during a previous reference signaling occasion. The control measurements may comprise Doppler measurements and/or signal strength measurements, for example.

The calibration measurements are performed to acquire channel transfer data enabling determination of the calibration coefficients. For example, the channel transfer data acquired by calibration measurements may be represented by the measurements $y_{m1,m2}$ described earlier herein. The results of the calibration measurements may be provided to the central node as suitable. For example, the results of the calibration measurements for a reference signalling occasion may be provided together with the information obtained by the control measurements (compare with step 350). Alternatively or additionally, the results of the calibration measurements may be provided to the central node collectively for all of the reference signalling occasions; at the end of the calibration process (e.g., as part of step 370).

The information obtained by measurements performed during the previous and particular reference signaling occasion may comprise a respective channel coherence time for the first access point relative to each of one or more other access points among the plurality of access points. It should be noted that the respective channel coherence times for different pairs of access points may be different. The respective channel coherence time for the first access point may be based on Doppler measurements performed by the first access point.

The dynamic selection of the first access point may comprise selecting the first access point to fulfill a coherence condition relative the reference signal transmitter of the previous reference signaling occasion.

The coherence condition may, for example, comprise that a time interval between the previous reference signaling occasion and the particular reference signaling occasion is shorter than the channel coherence time for the first access point relative the reference signal transmitter of the previous reference signaling occasion (i.e., that a time interval between the previous reference signaling occasion and the particular reference signaling occasion is shorter than the coherence time of the bi-directional link between the first access point and the reference signal transmitter of the previous reference signaling occasion).

In some embodiments, the first access point is selected—among access points fulfilling the coherence condition at the particular reference signaling occasion—as the one that has a shortest time, at the particular reference signaling occasion, until the coherence condition is no longer fulfilled. Thus, the access point for which it is most urgent to complete a bi-directional measurement may be selected as the first access point.

Generally, when there is a tie between two or more access points regarding selection as first access point, a random selection may be made between the two or more access points.

In some embodiments, the dynamic selection of the first access point is further based on a system time parameter (e.g., an OFDM slot in 5G NR) associated with a coherence assumption, and/or is further based on a movement estimation obtained by a sensor co-located with the first access point.

For example, a time threshold may be set based on one or more of: the channel coherence time, the system time parameter, and the movement estimation. Then, the dynamic selection of the first access point may comprise letting a time interval between a previous reference signaling occasion and the particular reference signaling occasion (wherein the first access point and the reference signal transmitter of the previous reference signaling occasion form respective ends of a bi-directional link) be shorter than the time threshold.

When the time threshold is formed as a combination of two or more parameters (e.g., the channel coherence time, the system time parameter, the movement estimation), the combination may comprise selecting the time threshold value as a minimum (worst case) time indicated by the two or more parameters, or as an average time indicated by the two or more parameters.

The information obtained by measurements performed during the previous and particular reference signaling occasion may comprise a respective reference signaling reliability for the first access point relative to each of one or more other access points among the plurality of access points. It should be noted that the respective reference signaling reliability for different pairs of access points may be different.

The respective reference signaling reliability for the first access point may be based on signal strength measurements performed by the first access point. Example signal strength measurements include received signal strength indicator (RSSI), reference signal received power (RSRP), reference signal received quality (RSRQ), signal-to-interference ratio (SIR), signal-to-noise ratio (SNR), signal-to-interference-and-noise ratio (SINR), etc.

The dynamic selection of the first access point may comprise selecting the first access point to fulfill a reliability condition relative the reference signal transmitter of the previous reference signaling occasion.

The reliability condition may, for example, comprise that a received signal strength metric for the reference signal transmitter of the previous reference signaling occasion, as obtained at the first access point, exceeds a signal strength metric threshold. Put differently, for an access point be selected as first access point to complete the bi-directional link to the reference signal transmitter of the previous reference signaling occasion, the reliability for reception at the first access point during the previous reference signaling occasion should be higher than some threshold value.

Generally, when there is a tie between two or more access points regarding selection as first access point, a random selection may be made between the two or more access points.

In some embodiments, the selection of the first access point comprises first determining which access points (e.g., among those that have not yet acted as reference signal transmitter during the calibration process) fulfil the reliability condition, and then selecting the first access point according to the coherence condition among those that fulfil the reliability condition.

The selection step 320 may comprise checking each access point against a list of requirements, and let the AP that fulfils most requirements be selected as first access point. An example list comprises the following requirements:

1. The access point has not acted as reference signaling transmitter earlier in the calibration process.
2. During reference signal transmission by other access points, the access point has performed measurements that indicate a link reliability that fulfills a reliability condition (e.g., received signal strength exceeding a signal strength threshold value).
3. The channel coherence time obtained for a link between the access point and another access point by previous measurements is longer than the elapsed time since the previous measurements were performed.
4. The access point has a smallest difference between the channel coherence time and the elapsed time of item 3.

Item 3 aims to ensure that all (or at least some) links to a considered access point are still reciprocal (or at least valid for calibration); i.e., not outdated by channel time-variations. Item 4 aims to ensure that the most critical links (i.e., those about to be outdated by time-variations) are given priority for reference signaling.

In some embodiments, an access point must fulfill item 1 to be considered for item 2, must fulfill item 2 to be considered for item 3, and must fulfill item 3 to be considered for item 4. In some embodiments, one or more of the items are optional. For example, only items 1 and 2 may be applied, or only items 1 and 3 and 4 may be applied, or only items 1 and 2 and 3 may be applied.

The channel coherence time can be estimated using any suitable approach. As already mentioned, Doppler-related measurements may be performed to estimate the channel coherence time.

In some embodiments, an access point may have a co-located/internal movement sensor (e.g., velocity-meter and/or accelerometer) which may provide an estimation of the access point velocity during the calibration procedure. The estimated velocity may be translated into a worst-case Doppler effect and used, together with any worst-case Doppler effect caused by another potentially moving access, to obtain an estimate of the channel coherence time.

In some embodiments, the channel coherence time may be assumed to correspond to a time parameter of UL/DL-related communication (e.g., an OFDM slot in 5G NR). When the UL/DL channel is assumed to remain invariant within the time parameter, it could also be assumed that the channels between the access points remain invariant.

For an initial reference signaling occasion during the calibration process, the first access point may be selected randomly among the plurality of access points, or as a default access point. In some embodiments, the first access point for an initial reference signaling occasion during the calibration process is selected dynamically based on information obtained by measurements performed during a previous calibration process. For example, an access point that has relatively many bi-directional links with stable conditions (e.g., in terms of calibration coefficient values, channel coherence time, etc.) according to previous calibration processes may be selected as the first access point for an initial reference signaling occasion.

Each access point of the plurality of access points is typically selected as the first access point at least once during the calibration process. In some embodiments, each access point of the plurality of access points is selected as the first access point exactly once during the calibration process. An access point of the plurality of access points may be selected as the first access point more than once during the calibration process.

For example, an access point may be selected as the first access point more than once to verify previous calibration measurements, or to enable energy accumulation for the calibration measurements over several reference signaling occasions (which may beneficial when the received signal strength has a relatively low value). Alternatively or additionally, an access point may be selected as the first access point more than once to improve the accuracy of the control measurements (e.g., to enable increased performance in Doppler estimation by increasing the amount of measurements). Yet alternatively or additionally, an access point may be selected as the first access point more than once when a bi-directional measurement for the access point was not completed within the time interval defined by the time threshold for the corresponding bi-directional link.

According to some embodiments, the dynamic selection of the first access point is selectively applied (e.g., only when channel conditions are time-varying). This is illustrated in FIG. 3 by optional step 310.

If the dynamic selection of the first access point is to be applied (Y-path out of step 310), then the method 300 proceeds to step 320 and executes the steps as described above. If the dynamic selection of the first access point is not to be applied (N-path out of step 310), then the method 300 may comprise applying static calibration signaling instead as illustrated by optional step 390 (e.g., using a predetermined order among the access points for reference signal transmission).

For example, step 310 may comprise determining an overall channel scenario status of the plurality of access points as stationary or variable; and activating the dynamic selection of the first access point (Y-path out of step 310) only when the overall channel scenario status is determined to be variable.

An advantage of only applying the dynamic selection of the first access point when it is considered to be beneficial, is that the signaling overhead may be reduced since the amount of control signaling (compare with step 340) and/or measurement information provision (compare with step 350) is significantly lower for static calibration signaling.

The overall channel scenario status may depend on environmental conditions. For example, windy conditions and/or vibrations may cause the APs to move and de-stabilize channel conditions. Alternatively or additionally, changes relating to (e.g., movement of) reflecting objects and/or obstructing objects may de-stabilize channel conditions.

Figure 4:
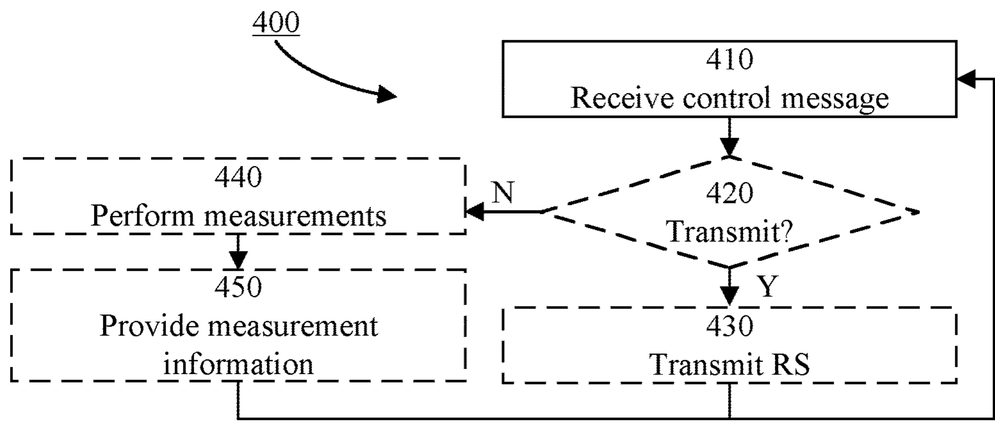
FIG. 4 is a flowchart illustrating example method steps according to some embodiments.

FIG. 4 illustrates an example method 400 according to some embodiments. The method 400 is performed by an access point for (e.g., of) a D-MIMO system comprising a plurality of access points. The D-MIMO system typically comprise a control node (e.g., a control node configured to perform the method 300 of FIG. 3).

The method 400 is performed during a calibration process with over-the-air reference signaling between access points. The calibration process comprises a plurality of reference signaling occasions. During each reference signaling occasion, the access point may act as a reference signal transmitter or may perform measurements.

The method 400 comprises, receiving a control message from the control node of the D-MIMO system prior to a particular reference signaling occasion and after a previous reference signaling occasion, as illustrated by step 410 (compare with step 340 of FIG. 3). As elaborated on above, the control message is responsive to dynamic access point selection among the plurality of access points based on information obtained by measurements performed during the previous reference signaling occasion.

The control message instructs the access point to act as a reference signal transmitter during the particular reference signaling occasion, or to perform measurements (e.g., control measurements and calibration measurements) during the particular reference signaling occasion. As explained above, an instruction to perform measurements may be implicit according to some embodiments.

In some embodiments, the control message (when instructing the access point to perform measurements) also informs the access point regarding which other access point acts as reference signal transmitter during the particular reference signaling occasion. This information may be beneficial, for example, if the access point is configured to perform any analysis of the measurements and/or if more than one access points act as reference signal transmitter.

The method 400 may determine whether or not the control message instructs the access point to act as the reference signal transmitter, as illustrated by optional step 420.

When the control message instructs the access point to act as the reference signal transmitter during the particular reference signaling occasion (Y-path out of step 420), the method 400 may proceed to optional step 430, where reference signaling is transmitted during the particular reference signaling occasion. When the control message instructs the access point to perform measurements during the particular reference signaling occasion (N-path out of step 420), the method 400 may proceed to optional step 440, where measurements are performed during the particular reference signaling occasion.

After step 440, the method 400 may comprise providing information obtained by the measurements to the control node, as illustrated by optional step 450 (compare with step 350 of FIG. 3). Step 450 is typically executed prior to a subsequent reference signaling occasion.

The method 400 is performed for at least one particular reference signaling occasion. For example, the method 400 may be performed for each (or at least some) of the reference signaling occasions of the calibration process, as illustrated by loopbacks to step 410 from steps 430 and 450 (compare with the loopback from step 360 to step 320 in FIG. 3).

The reference signaling transmission (step 430) may be performed using any suitable approach. For example, the transmission may be in the form of omni-directional transmission, wide beam transmission, or beam sweep transmission. Alternatively or additionally, the transmission may comprise a single reference signal (which may enable signal strength measurements) or two or more consecutive reference signals (which may enable signal strength measurements and Doppler measurements).

The reference signaling may comprise any suitable reference signals. In some embodiments, the reference signaling comprises reference signals in accordance to Fifth Generation New Radio (5G NR). Example reference signaling include channel state information reference signals (CSI-RS), demodulation reference signals (DMRS), and synchronization signaling block (SSB) signals. In some embodiments, data-bearing signals (e.g., in physical downlink shared channel, PDSCH) may be considered as reference signals in this context. This is since a measuring access point could know which data symbols were transmitted, and could treat the data-bearing signals as reference signals.

Typically, the first access point transmits two or more reference signals consecutively during the reference signaling occasion. With multiple reference signals, a measuring access point can accumulate energy over the reference signals to improve calibration accuracy. Also, with multiple reference signals, Doppler statistics can be computed based on the reference signal measurements.

The reference signaling measurements (step 440) may be performed using any suitable approach. For example, the measurements may be for omni-directional reception, wide beam reception, multiple beam reception, or beam sweep reception.

Step 440 may also comprise using the reference signaling measurements to determine whether there is a reliable link between the measuring access point and the transmitting access point, and/or to determine whether there is a reciprocal link between the measuring access point and the transmitting access point; both exemplified below. In some embodiments, such determinations may be performed (in part or in full) by the control node instead.

For reliability, a measuring access point may compute a link reliability metric based on the received reference signals. Example link reliability metrics include: path gain, path loss, RSSI, SIR, SNR, SINR, RSRP, RSRQ, etc.

A measuring access point may also compare the link reliability metric(s) with corresponding threshold(s).

A threshold value may represent the lowest/highest acceptable value for the corresponding link reliability metric.

In some embodiments, the result of the threshold comparison(s) is represented by binary digits describing on what side of the threshold the corresponding link reliability metric falls. For example, "0" may represent that the link reliability metric did not satisfy the threshold condition and "1" may represent that the link reliability metric satisfied the threshold condition.

When there are more than one threshold comparison (e.g., more than one link reliability metric), an overall decision may be taken based on all the result of all the threshold comparisons (e.g., using Boolean algebra). For example, letting $X_{(i)} \in \{0,1\}$ denote the outcome of the comparison for link reliability metric i, the overall decision $X \in \{0,1\}$ may be computed as $X=X_{(1)} \wedge X_{(2)} \wedge \ldots \wedge X_{(N)}$, where N is the number of threshold comparisons, A denotes the logical AND operator, X=0 represents that the link is not suitable for calibration signaling, and X=1 represents that the link is suitable for calibration signaling.

For reciprocity, a measuring access point may compute a Doppler-related metric based on the received reference signals. The Doppler-related metric can be used to infer the coherence time of the associated channel. Example Doppler-related metrics include: Doppler spread, magnitude of the largest Doppler shift of the channel, magnitude of the smallest Doppler shift of the channel, etc.

Figure 5:
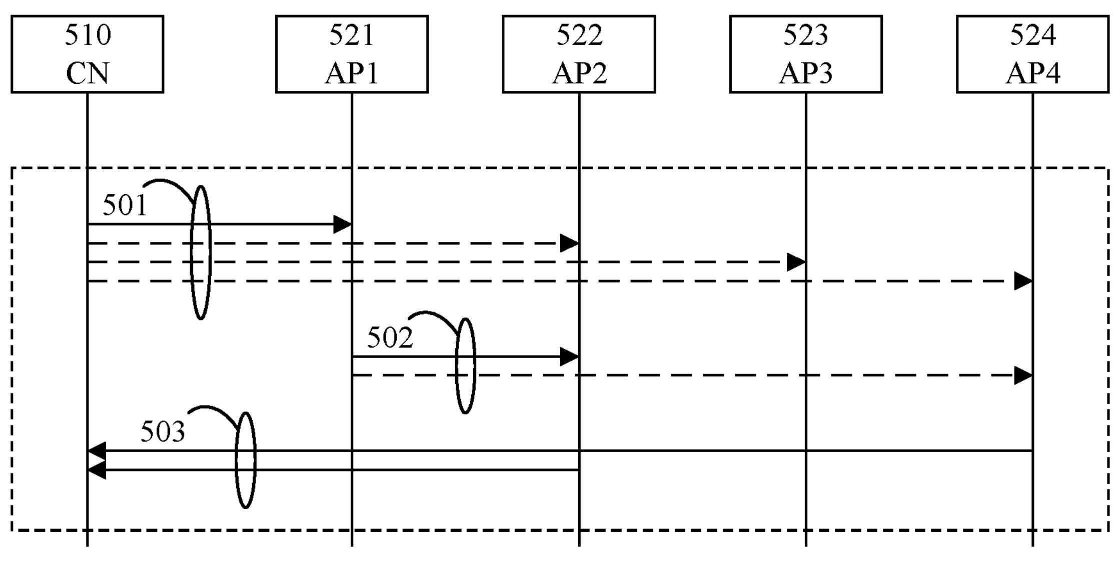
FIG. 5 is a signaling diagram illustrating example signaling according to some embodiments.

FIG. 5 illustrates example signaling according to some embodiments. The signaling involves a control node (CN) 510 of a D-MIMO system and a plurality of access points (AP1, AP2, AP3, AP4) 521, 522, 523, 524 of the D-MIMO system.

For example, the control node 510 may be configured to perform the method 300 of FIG. 3 and/or each of the access points 521, 522, 523, 524 may be configured to perform the method 400 of FIG. 4.

The control node 510 controls the access points 521, 522, 523, 524 by conveying one or more control messages 501 (compare with step 340 of FIG. 3), to be received by the access points (compare with step 410 of FIG. 4).

A control message 501 may instruct an access point to act as a reference signal transmitter during the particular reference signaling occasion, or to perform measurements during the particular reference signaling occasion, or to neither act as a reference signal transmitter nor perform measurements during the particular reference signaling occasion.

As mentioned before, an instruction to perform measurements may be implicit according to some embodiments. Alternatively or additionally, an instruction to neither act as a reference signal transmitter nor perform measurements may be implicit. The possibility of implicit control is illustrated by dashed lines for the control message 501 in FIG. 5.

An access point, which is instructed by the control message 501 to act as reference signal transmitter (a dynamically selected first access point; e.g., AP1 521), transmits reference signaling 502 accordingly (compare with step 430 of FIG. 4).

An access point, which is instructed by the control message 501 to perform measurements (e.g., a dynamically selected second access point; e.g., AP2 522), performs measurements accordingly based on the reference signaling 502 (compare with step 440 of FIG. 4).

An access point, which is not instructed by the control message 501 to act as either reference signal transmitter or perform measurements (e.g., an excluded third access point; e.g., AP3 523), may be idle or involved in communication signaling during the reference signaling 502.

An access point, which is instructed by the control message 501 to perform measurements (e.g., a dynamically selected second access point; e.g., AP4 524), may be unsuccessful in its attempts to perform measurements due to the reference signaling 502 not reaching the measuring access point (illustrated by dashed line for the control message 502 in FIG. 5).

As illustrated by 503, information obtained by the measurements is provided from the measuring access points 522, 524 (compare with step 450 of FIG. 4) to be received by the control node 510 (compare with step 350 of FIG. 3).

Generally, reporting from access points to the control node may comprise metrics from any stage between raw measurement data to metrics (e.g., estimated channel coherence time and/or reliability) that can be directly used in subsequent selection steps.

The signaling of FIG. 5 is performed for at least one particular reference signaling occasion. For example, the signaling of FIG. 5 may be performed for each (or at least some) of the reference signaling occasions of the calibration process (compare with the loopback from step 360 to step 320 in FIG. 3, and with loopbacks to step 410 from steps 430 and 450 in FIG. 4).

Generally, some embodiments are suitable for the context of a signaling protocol which is configured to calibrate a D-MIMO system. An aim of some approaches is to guarantee small enough time differences between any two measurements which jointly comprise a bi-directional measurement, to avoid channel changes that makes the reciprocity assumption invalid.

It should be noted that the protocol does not rely on apriori knowledge of channel properties between access points (e.g., it is not assumed that the path losses between access points are known prior to the calibration process).

Figure 6:
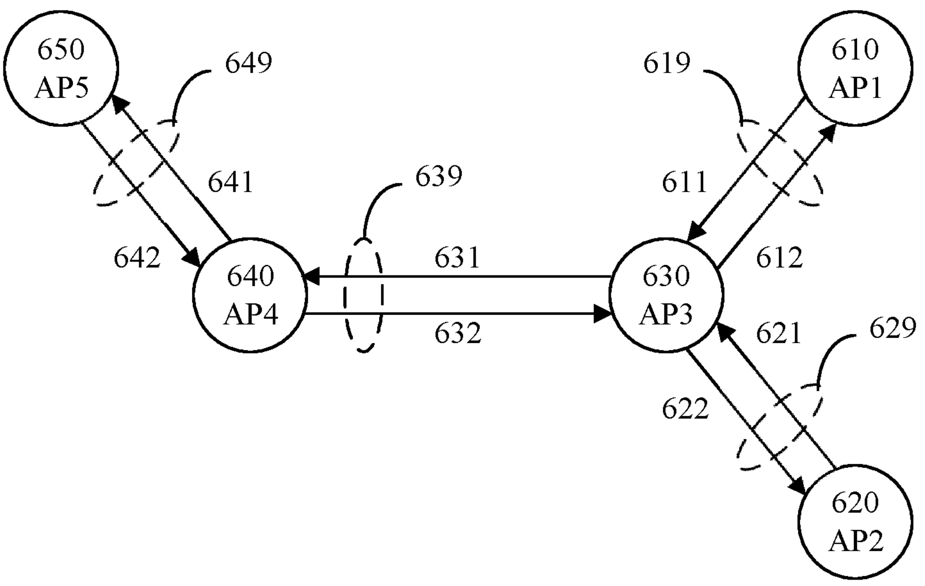
FIG. 6 is a schematic drawing illustrating example bi-directional links for calibration according to some embodiments.

FIG. 6 schematically illustrates an example situation with bi-directional links for calibration of a D-MIMO system according to some embodiments. The example situation has five access points (AP1, AP2, AP3, AP4, AP5) 610, 620, 630, 640, 650.

According to the example of FIG. 6, there is a reliable bi-directional link 611, 612 between AP1 and AP3 with a channel coherence time of 8 time units (e.g., 8 OFDM symbols) as represented by 619, a reliable bi-directional link 621, 622 between AP2 and AP3 with a channel coherence time of 10 time units (e.g., 10 OFDM symbols) as represented by 629, a reliable bi-directional link 631, 632 between AP3 and AP4 with a channel coherence time of 4 time units (e.g., 4 OFDM symbols) as represented by 639, and a reliable bi-directional link 641, 642 between AP4 and AP5 with a channel coherence time of 8 time units (e.g., 8 OFDM symbols) as represented by 649. Between the access points in other access point pairs (i.e., AP1-AP2, AP1-AP4, AP1-AP5, AP2-AP4, AP2-AP5, and AP3-AP5), there are no bi-directional links that are reliable. It is desirable to perform calibration measurements for the reliable bi-directional links.

The access points and the corresponding reliable bi-directional links may be seen as graph. It should be noted that the control node of the D-MIMO system typically does not have apriori information to specify the graph before the calibration process. Instead, the control node successively learns the graph on-the-fly via measurements and uses the learnt portions of the graph to select the order of link measurements (by selecting the order of access points acting as reference signaling transmitters).

For the purpose of this example, it is assumed that each access point is equipped by a single antenna, that a transmitting access point always sends two consecutive reference signals for calibration, and that the duration of one reference signal equals one time unit (e.g., the duration of one OFDM symbol). Thus, transmission of two consecutive reference signals for calibration amounts to a time duration that corresponds to two time units (e.g., 2 consecutive OFDM symbols).

Also for the purpose of this example, processing time aspects (e.g., computation of RSSI and/or Doppler estimates from the received signals) are ignored, as well as propagation times. These aspects could be accommodated for in practice by (e.g., by refraining from reference signal transmission during one time unit in the beginning and/or of each reference signaling occasion).

Items 1-4 of the example list of requirements will be used to illustrate dynamic selection of access points to act as reference signaling transmitters.

For an initial reference signaling occasion, it may be concluded that all access points 610, 620, 630, 640, 650 meet the condition of item 1 ("the access point has not acted as reference signaling transmitter earlier in the calibration process"). Since no measurements have been performed, none of the access points 610, 620, 630, 640, 650 meet the condition of item 2 ("during reference signal transmission by other access points, the access point has performed measurements that indicate a link reliability that fulfills a reliability condition"). Therefore, the access point to transmit initially (i.e., the initial first access point) may be selected arbitrarily, and AP2 620 is used as an example selection in the following.

After reference signaling transmission by AP2, the control node is provided with information obtained by measurements performed by AP1, AP3, AP4, AP5 during the reference signaling transmission by AP2. The following table may be used to illustrate the information collected by the control node:

| | 1 | 2 | 3 | 4 | 5 |
|---|---|---|---|---|---|
| 1 | — | | | | |
| 2 | 0 (2) | — | 1 (2) | 0 (2) | 0 (2) |
| 3 | | | — | | |
| 4 | | | | — | |
| 5 | | | | | — |

Each row represents an access point acting as reference signaling transmitter and each column represents an access point performing measurements. A dash in the table corresponds to an undefined entry. The entry "x (y)" represents that the link is reliable when x=1 and unreliable when x=0, and that the measurements were performed in a reference signaling occasion which is time stamped by the value of y. Thus, x may represent reliability information collected by the control node. Channel coherence time information is also collected by the control node for each measured link, but this is not shown in the table. In this example, it is assumed that the reference signaling occasions extend over two time units (e.g., 2 consecutive OFDM symbols) and that the reference signaling occasions follows directly after each other. Thus, the time stamp y for each reference signaling occasion may be a multiple of two.

For the next reference signaling occasion, it may be concluded that access points 610, 630, 640, 650 meet the condition of item 1 ("the access point has not acted as reference signaling transmitter earlier in the calibration process"). Among those access points, only access point AP3 630 meets the condition of item 2 ("during reference signal transmission by other access points, the access point has performed measurements that indicate a link reliability that fulfills a reliability condition", corresponding to x=1 in the table). Therefore, the next access point to transmit (i.e., the next first access point) may be selected as AP3 630.

After reference signaling transmission by AP3, the control node is provided with information obtained by measurements performed by AP1, AP2, AP4, AP5 during the reference signaling transmission by AP3, and the table may be updated to:

| | 1 | 2 | 3 | 4 | 5 |
|---|---|---|---|---|---|
| 1 | — | | | | |
| 2 | 0 (2) | — | 1 (2) | 0 (2) | 0 (2) |
| 3 | 1 (4) | 1 (4) | — | 1 (4) | 0 (4) |
| 4 | | | | — | |
| 5 | | | | | — |

At this stage of the example, a bi-directional measurement which enables calibration of AP2 and AP3 (i.e., $\{y_{2,3}, y_{3,2}\}$) is available. It should be noted that that the total duration for the corresponding measurements is smaller than the channel coherence time associated with that bi-directional link. More specifically, the total duration for the corresponding measurements was four time units (i.e., one reference signaling occasion per link direction; performed directly after each other) and the channel coherence time associated with the bi-directional link between AP2 and AP3 is 10 time units.

For the next reference signaling occasion, it may be concluded that access points 610, 640, 650 meet the condition of item 1 ("the access point has not acted as reference signaling transmitter earlier in the calibration process"). Among those access points, access points AP1 610 and AP4 640 both meet the condition of item 2 ("during reference signal transmission by other access points, the access point has performed measurements that indicate a link reliability that fulfills a reliability condition", corresponding to x=1 in the table).

The relevant channel coherence time for selection of AP1 is that relating to the link towards AP3 (i.e., 8 time units), and the relevant channel coherence time for selection of AP4 is that relating to the link towards AP3 (i.e., 4 time units). The previous measurements performed for both these links where made at the same time; during the directly previous reference signaling occasion (resulting in a potential total duration for the corresponding measurements of four time units).

Therefore, the next access point to transmit (i.e., the next first access point) may be selected as AP4 640 if the conditions of items 3 and 4 are applied ("the channel coherence time obtained for a link between the access point and another access point by previous measurements is longer than the elapsed time since the previous measurements were performed"—true for both AP1 (8>2) and AP4 (4>2)—and "the access point has a smallest difference between the channel coherence time and the elapsed time of item 3"—true for AP4 (4-2<8-2)).

After reference signaling transmission by AP4, the control node is provided with information obtained by measurements performed by AP1, AP2, AP3, AP5 during the reference signaling transmission by AP4, and the table may be updated to:

| | 1 | 2 | 3 | 4 | 5 |
|---|---|---|---|---|---|
| 1 | — | | | | |
| 2 | 0 (2) | — | 1 (2) | 0 (2) | 0 (2) |
| 3 | 1 (4) | 1 (4) | — | 1 (4) | 0 (4) |
| 4 | 0 (6) | 0 (6) | 1 (6) | — | 1 (6) |
| 5 | | | | | — |

At this stage of the example, a bi-directional measurement which enables calibration of AP3 and AP4 (i.e., $\{y_{3,4}, y_{4,3}\}$) is available. It should be noted that that the total duration for the corresponding measurements is equal to (i.e., not larger than) the channel coherence time associated with that bi-directional link. More specifically, the total duration for the corresponding measurements was four time units (i.e., one reference signaling occasion per link direction; performed directly after each other) and the channel coherence time associated with the bi-directional link between AP3 and AP4 is 4 time units. It may also be noted that the "path" of bi-directional links from AP2 to AP4 via AP3 provides indirect calibration between AP2 and AP4.

For the next reference signaling occasion, it may be concluded that access points 610, 650 meet the condition of item 1 ("the access point has not acted as reference signaling transmitter earlier in the calibration process"). Among those access points, both meet the condition of item 2 ("during reference signal transmission by other access points, the access point has performed measurements that indicate a link reliability that fulfills a reliability condition", corresponding to x=1 in the table).

The relevant channel coherence time for selection of AP1 is that relating to the link towards AP3 (i.e., 8 time units), and the relevant channel coherence time for selection of AP5 is that relating to the link towards AP4 (i.e., 8 time units). The previous measurements performed for the link between AP4 and AP5 was made during the directly previous reference signaling occasion (resulting in a potential total duration for the corresponding measurements of four time units), while the previous measurements performed for the link between AP1 and AP3 was made during an earlier previous reference signaling occasion (resulting in a potential total duration for the corresponding measurements of six time units).

Therefore, the next access point to transmit (i.e., the next first access point) may be selected as AP1 610 if the conditions of items 3 and 4 are applied ("the channel coherence time obtained for a link between the access point and another access point by previous measurements is longer than the elapsed time since the previous measurements were performed"—true for both AP1 (8>6) and AP5 (8>2)—and "the access point has a smallest difference between the channel coherence time and the elapsed time of item 3"—true for AP1 (8-6<8-2)).

After reference signaling transmission by AP1, the control node is provided with information obtained by measurements performed by AP2, AP3, AP4, AP5 during the reference signaling transmission by AP1, and the table may be updated to:

| | 1 | 2 | 3 | 4 | 5 |
|---|---|---|---|---|---|
| 1 | — | 0 (8) | 1 (8) | 0 (8) | 0 (8) |
| 2 | 0 (2) | — | 1 (2) | 0 (2) | 0 (2) |
| 3 | 1 (4) | 1 (4) | — | 1 (4) | 0 (4) |
| 4 | 0 (6) | 0 (6) | 1 (6) | — | 1 (6) |
| 5 | | | | | — |

At this stage of the example, a bi-directional measurement which enables calibration of AP1 and AP3 (i.e., $\{y_{1,3}, y_{3,1}\}$) is available. It should be noted that that the total duration for the corresponding measurements is smaller than the channel coherence time associated with that bi-directional link. More specifically, the total duration for the corresponding measurements was six time units (i.e., one reference signaling occasion per link direction; performed with one reference signaling occasion between them) and the channel coherence time associated with the bi-directional link between AP1 and AP3 is 8 time units. It may also be noted that the "path" of bi-directional links from AP1 to AP4 via AP3 provides indirect calibration between AP1 and AP4, and the "path" of bi-directional links from AP1 to AP2 via AP3 provides indirect calibration between AP1 and AP2.

For the next reference signaling occasion, it may be concluded that only access point 650 meets the condition of item 1 ("the access point has not acted as reference signaling transmitter earlier in the calibration process"). Therefore, the next access point to transmit (i.e., the next first access point) may be selected as AP5 650.

After reference signaling transmission by AP1, the control node is provided with information obtained by measurements performed by AP2, AP3, AP4, AP5 during the reference signaling transmission by AP1, and the table may be updated to:

| | 1 | 2 | 3 | 4 | 5 |
|---|---|---|---|---|---|
| 1 | — | 0 (8) | 1 (8) | 0 (8) | 0 (8) |
| 2 | 0 (2) | — | 1 (2) | 0 (2) | 0 (2) |
| 3 | 1 (4) | 1 (4) | — | 1 (4) | 0 (4) |
| 4 | 0 (6) | 0 (6) | 1 (6) | — | 1 (6) |
| 5 | 0 (10) | 0 (10) | 0 (10) | 1 (10) | — |

At this stage of the example, a bi-directional measurement which enables calibration of AP4 and AP5 (i.e., $\{y_{4,5}, y_{5,4}\}$) is available. It should be noted that that the total duration for the corresponding measurements is smaller than the channel coherence time associated with that bi-directional link. More specifically, the total duration for the corresponding measurements was six time units (i.e., one reference signaling occasion per link direction; performed with one reference signaling occasion between them) and the channel coherence time associated with the bi-directional link between AP4 and AP5 is 8 time units. It may also be noted that the "path" of bi-directional links from AP3 to AP5 via AP4 provides indirect calibration between AP3 and AP5, the "path" of bi-directional links from AP1 to AP5 via AP3 and AP4 provides indirect calibration between AP1 and AP5, and the "path" of bi-directional links from AP2 to AP5 via AP3 and AP4 provides indirect calibration between AP2 and AP5. Thus, the collection of access points shown in FIG. 6 can be fully calibrated in relation to each other.

This example illustrates that some embodiments enable the two measurements of a bi-directional link to be performed within the channel coherence time of the bi-directional link, which typically improve the calibration result compared to using a pre-determined order for reference signal transmission among the access points.

For the purpose of illustration, note the table above may be compared with the following corresponding table based a pre-determined order for reference signal transmission among the access points; namely AP1-AP2-AP4-AP5-AP3:

| | 1 | 2 | 3 | 4 | 5 |
|---|---|---|---|---|---|
| 1 | — | 0 (2) | 1 (2) | 0 (2) | 0 (2) |
| 2 | 0 (4) | — | 1 (4) | 0 (4) | 0 (4) |
| 3 | 1 (10) | 1 (10) | — | 1 (10) | 0 (10) |
| 4 | 0 (6) | 0 (6) | 1 (6) | — | 1 (6) |
| 5 | 0 (8) | 0 (8) | 0 (8) | 1 (8) | — |

It should be noted that that the total duration for corresponding measurements of a bi-directional link between AP1 and AP3 is larger than the channel coherence time associated with that bi-directional link.

More specifically, the total duration for the corresponding measurements of the bi-directional link between AP1 and AP3 was ten time units (i.e., one reference signaling occasion per link direction; performed with three reference signaling occasion between them) and the channel coherence time associated with the bi-directional link between AP1 and AP3 is 8 time units. Thus, the reciprocity assumption may not be valid and the calibration measurements for this link may be erroneous (or at least have poor accuracy).

An advantage of some embodiments is that alternative approaches for calibration of a multi-antenna transceiver system are provided.

An advantage of some embodiments is that calibration approaches are provided which are suitable for D-MIMO. In D-MIMO, the channels can generally not be assumed to be time-invariant. Therefore, it may be important that measurements forming a bi-directional link are performed closely in time (e.g., within a time interval that has a duration that equals the channel coherence time). This is achieved, according to some embodiments, by dynamically selecting the order in which the access points act as reference signaling transmitters, based on information obtained by measurements performed during a previous reference signaling occasion.

An advantage of some embodiments is that less signaling overhead may be required than for other over-the-air signaling approaches. For example, using a pre-determined order in which the access points act as reference signaling transmitters typically leads to bi-directional measurements that are not useful (or have poor accuracy). Hence, calibration signaling may need to be performed more often for such approaches than for the approaches of some embodiments.

An advantage of some embodiments is that more accurate calibration may be achieved than for other over-the-air signaling approaches. For example, using a pre-determined order in which the access points act as reference signaling transmitters typically leads to bi-directional measurements that are not useful (or have poor accuracy). Contrarily, approaches according to some embodiments entail that measurements forming a bi-directional link are performed closely in time.

An advantage of some embodiments is that negative impact of being dependent on the radio channel is mitigated. For example, using a pre-determined order in which the access points act as reference signaling transmitters typically leads to at least some bi-directional measurements being performed with a relatively large time duration between them. This makes the bi-directional measurement more sensitive to time variance of the radio channel. Contrarily, approaches according to some embodiments entail that measurements forming a bi-directional link are performed closely in time, making the bi-directional measurement robust against time variance of the radio channel.

An advantage of some embodiments is that the calibration approaches are applicable also when the number of access points increases. For example, using a pre-determined order in which the access points act as reference signaling transmitters, the risk that at least some bi-directional measurements are performed with a relatively large time duration between them increases with increasing number of access point. Contrarily to other calibration schemes, some embodiments enable calibration of large-scale D-MIMO systems, wherein the time difference is relatively small between any two measurements which jointly define a bi-directional link. This typically results in calibration of large-scale D-MIMO systems, which is robust in relation to a time-varying channel between a pair of access points.

Figure 7:
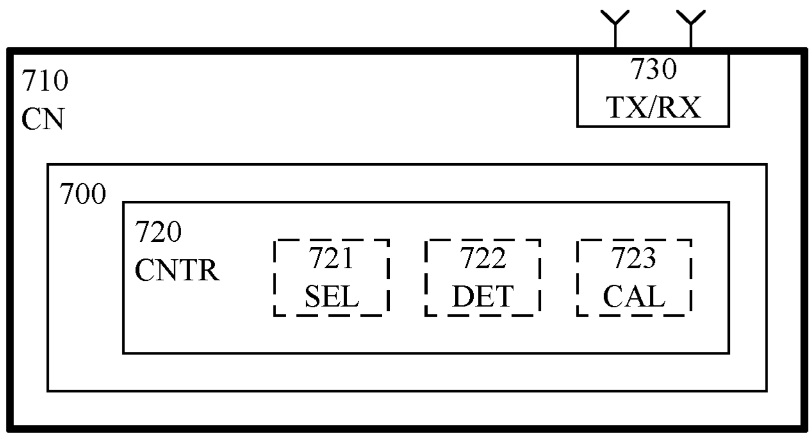
FIG. 7 is a schematic block diagram illustrating an example apparatus according to some embodiments.

FIG. 7 schematically illustrates an example apparatus 700 according to some embodiments. For example, the apparatus 700 may be comprisable (e.g., comprised) in a control node (CN; e.g., the CN 510 of FIG. 5) 710 for a D-MIMO system. Alternatively or additionally, the apparatus 700 may be configured to cause performance of (e.g., perform) one or more of the method steps described in connection with the method 300 of FIG. 3.

The apparatus 700 comprises a controller (CNTR; e.g., controlling circuitry or a control module) 720. The controller 720 is configured to operate during a calibration process with over-the-air reference signaling between access points of the D-MIMO system, wherein the calibration process comprises a plurality of reference signaling occasions.

The controller 720 is configured to cause dynamic selection of a first access point among the plurality of access points and based on information obtained by measurements performed during a previous reference signaling occasion (compare with step 320 of FIG. 3).

The controller 720 may also be configured to cause dynamic selection of a second access point among the plurality of access points excluding the first access point (compare with step 330 of FIG. 3).

To this end, the controller 720 may comprise, or be otherwise associated with (e.g., connected, or connectable, to) a selector (SEL; e.g., selecting circuitry or a selection module) 721. The selector 721 may be configured to dynamically select the first access point; and—when applicable—the second access point.

The controller 720 is also configured to cause control of the first access point to act as a reference signal transmitter during a particular reference signaling occasion; and—when applicable—to cause control of the second access point to perform measurements during the particular reference signaling occasion (compare with step 340 of FIG. 3).

The controller 720 may also be configured to cause reception, prior to a subsequent reference signaling occasion, of information obtained by measurements performed during the particular reference signaling occasion (compare with step 350 of FIG. 3).

To this end, the controller 720 may comprise, or be otherwise associated with (e.g., connected, or connectable, to) a transceiver (TX/RX; e.g., transceiving circuitry or a transceiver module) 730. The transceiver 730 may be configured to transmit a control message for control of the first access point; and—when applicable—the second access point. The transceiver 730 may also be configured to receive the information obtained by measurements performed during the particular reference signaling occasion.

According to some embodiments, the controller 720 is also configured to cause determination of whether or not to apply the dynamic selection of the first access point (compare with step 310 of FIG. 3). For example, the controller may be configured to cause application of the dynamic selection of the first access point when an overall channel scenario status is determined to be variable, and to apply static calibration signaling otherwise (compare with step 390 of FIG. 3).

To this end, the controller 720 may comprise, or be otherwise associated with (e.g., connected, or connectable, to) a determiner (DET; e.g., determining circuitry or a determination module) 722. The determiner 711 may be configured to determine whether or not to apply the dynamic selection of the first access point.

The controller 720 may also be configured to cause calibration; including determination of calibration coefficients for the plurality of access points based on channel transfer data acquired by measurements performed during the plurality of reference signaling occasions (compare with step 370 of FIG. 3).

To this end, the controller 720 may comprise, or be otherwise associated with (e.g., connected, or connectable, to) a calibrator (CAL; e.g., calibrating circuitry or a calibration module) 723. The calibrator may be configured to perform calibration steps; including determination of calibration coefficients.

One aspect is an apparatus for a control node for a distributed multiple-input multiple-output (D-MIMO) system comprising a plurality of access points. The apparatus comprises a selector and a transmitter. The selector is configured to—during a calibration process with over-the-air reference signaling between access points, wherein the calibration process comprises a plurality of reference signaling occasions, and for at least one particular reference signaling occasion—dynamically select a first access point (among the plurality of access points and based on information obtained by measurements performed during a previous reference signaling occasion). The transmitter is configured to control the first access point to act as a reference signal transmitter during the particular reference signaling occasion.

Figure 8:
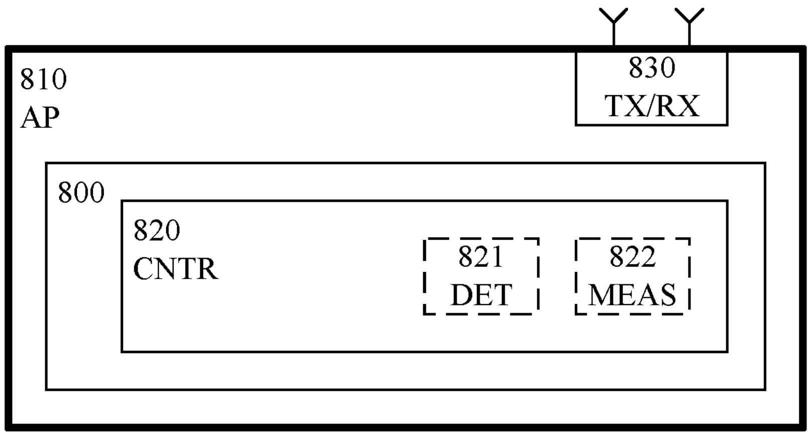
FIG. 8 is a schematic block diagram illustrating an example apparatus according to some embodiments.

FIG. 8 schematically illustrates an example apparatus 800 according to some embodiments. For example, the apparatus 800 may be comprisable (e.g., comprised) in an access point (AP; e.g., any of AP1, AP2, AP3, AP4 521, 522, 523, 524 of FIG. 5) 810 for a D-MIMO system. Alternatively or additionally, the apparatus 800 may be configured to cause performance of (e.g., perform) one or more of the method steps described in connection with the method 400 of FIG. 4.

The apparatus 800 comprises a controller (CNTR; e.g., controlling circuitry or a control module) 820. The controller 820 is configured to operate during a calibration process with over-the-air reference signaling between access points of the D-MIMO system, wherein the calibration process comprises a plurality of reference signaling occasions.

The controller 820 is configured to cause—for at least one particular reference signaling occasion—reception of a control message from a control node of the D-MIMO system prior to the particular reference signaling occasion and after a previous reference signaling occasion (compare with step 410 of FIG. 4).

The control message instructs the access point to act as a reference signal transmitter during the particular reference signaling occasion, or to perform measurements during the particular reference signaling occasion.

To this end, the controller 820 may comprise, or be otherwise associated with (e.g., connected, or connectable, to) a transceiver (TX/RX; e.g., transceiving circuitry or a transceiver module) 830. The transceiver 830 may be configured to receive the control message.

The controller 820 may also be configured to cause determination of whether or not the control message instructs the access point to act as reference signal transmitter (compare with step 420 of FIG. 4).

To this end, the controller 820 may comprise, or be otherwise associated with (e.g., connected, or connectable, to) a determiner (DET; e.g., determining circuitry or a determination module) 821. The determiner 821 may be configured to determine whether or not the control message instructs the access point to act as reference signal transmitter.

The controller 820 may also be configured to cause transmission of reference signaling during the particular reference signaling occasion when the control message instructs the access point to act as the reference signal transmitter (compare with step 430 of FIG. 4). The transceiver 830 may be configured to transmit the reference signaling.

The controller 820 may also be configured to cause measurements to be performed during the particular reference signaling occasion when the control message instructs the access point to perform measurements (compare with step 440 of FIG. 4).

To this end, the controller 820 may comprise, or be otherwise associated with (e.g., connected, or connectable, to) a measurer (MEAS; e.g., measuring circuitry or a measurement module) 822. The measurer 822 may be configured to perform the measurements.

The controller 820 may also be configured to cause provision to the control node of information obtained by the measurements (compare with step 450 of FIG. 4). The transceiver 830 may be configured to provide the obtained information to the control node.

One aspect is an apparatus for an access point for a distributed multiple-input multiple-output (D-MIMO) system comprising a plurality of access points. The apparatus comprises a receiver. The receiver is configured to—during a calibration process with over-the-air reference signaling between access points, wherein the calibration process comprises a plurality of reference signaling occasions, and for at least one particular reference signaling occasion—receive a control message from a control node of the D-MIMO system prior to the particular reference signaling occasion and after a previous reference signaling occasion.

The reception of the control message is responsive to dynamic access point selection among the plurality of access points based on information obtained by measurements performed during the previous reference signaling occasion. The control message instructs the access point to act as a reference signal transmitter during the particular reference signaling occasion, or perform measurements during the particular reference signaling occasion.

Figure 9:
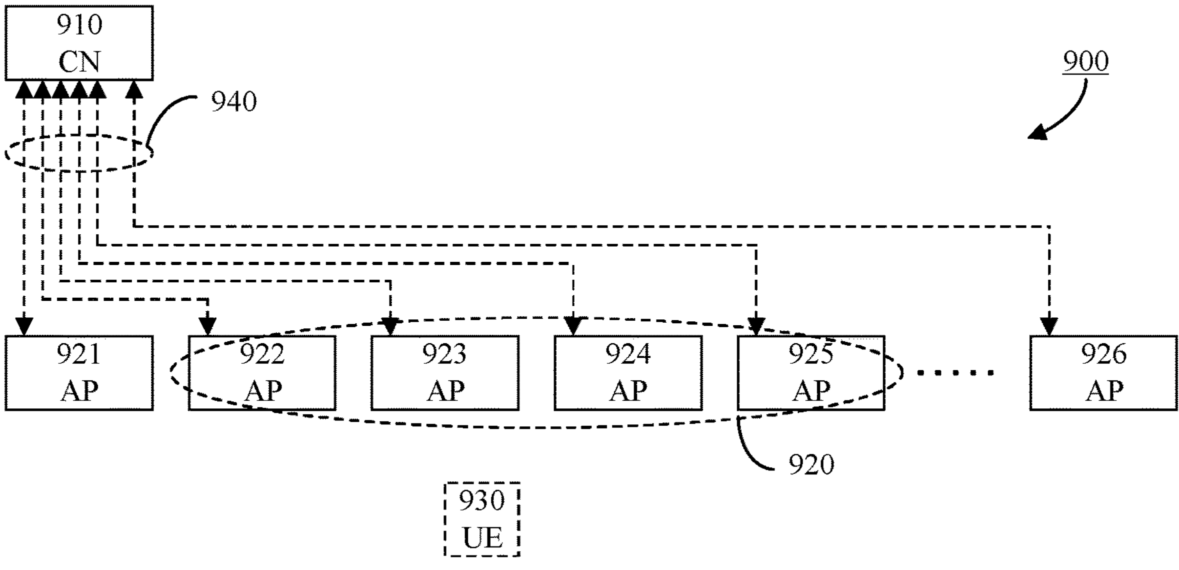
FIG. 9 is a schematic drawing illustrating an example D-MIMO system according to some embodiments.

FIG. 9 schematically illustrates an example D-MIMO system 900 according to some embodiments. The D-MIMO system 900 comprises a control node (CN; compare with 710 of FIG. 7 and 510 of FIG. 5) 910 and a plurality of access points (AP; compare with 810 of FIG. 8 and 521, 522, 523, 524 of FIG. 5) 921, 922, 923, 924, 925, 926.

The access points 921, 922, 923, 924, 925, 926 are controlled by the control node 910. For example, the control node 910 may be configured to perform one or more of the method steps described in connection with the method 300 of FIG. 3. Alternatively or additionally, each of the access points 921, 922, 923, 924, 925, 926 may be configured to perform one or more of the method steps described in connection with the method 400 of FIG. 4.

Control communication between the control node and the plurality of access points may be based on wireless, or wired, communication. It may be noted that avoiding wired interfaces between the access points, and/or between access points and the control node, allows for increased flexibility, and/or scalability, of the D-MIMO deployment.

In the example D-MIMO system 900, the control communication between the control node and the plurality of access points relies on wireless communication between the control node and the plurality of access points, as illustrated by 940. Furthermore, the access points have no wired interface between them.

Each access point 921, 922, 923, 924, 925, 926 may have a single antenna, or relatively few (e.g., two) antennas, while the D-MIMO system 900 enables (massive) MIMO operation, wherein several access points are active for communication with a user device (e.g., a user equipment, UE) 930. For example, a group 920 of access points, comprising the access points 922, 923, 924, 925 that are closest to the user device 930 (e.g., in a geographical sense and/or in a radio propagation sense), may be used for MIMO communication with the user device 930.

Generally, it should be noted that a features described herein in connection to one of the Figures is equally applicable (when suitable) in the context of another one of the Figures; even if not explicitly mention in connection thereto.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a control node or an access point for a D-MIMO system.

Embodiments may appear within an electronic apparatus (such as a control node or an access point for a D-MIMO system) comprising arrangements, circuitry, and/or logic according to any of the embodiments described herein. Alternatively or additionally, an electronic apparatus (such as a control node or an access point for a D-MIMO system) may be configured to perform method steps according to any of the embodiments described herein.

Figure 10:
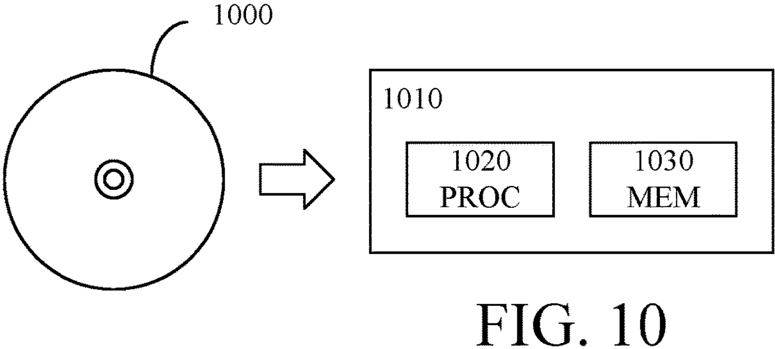
FIG. 10 is a schematic drawing illustrating an example computer readable medium according to some embodiments.

According to some embodiments, a computer program product comprises a non-transitory computer readable medium such as, for example, a universal serial bus (USB) memory, a plug-in card, an embedded drive, or a read only memory (ROM). FIG. 10 illustrates an example computer readable medium in the form of a compact disc (CD) ROM 1000. The computer readable medium has stored thereon a computer program comprising program instructions. The computer program is loadable into a data processor (PROC; e.g., a data processing unit) 1020, which may, for example, be comprised in a control node or an access point for a D-MIMO system 1010. When loaded into the data processor, the computer program may be stored in a memory (MEM) 1030 associated with, or comprised in, the data processor. According to some embodiments, the computer program may, when loaded into, and run by, the data processor, cause execution of method steps according to, for example, any of the methods illustrated in FIGS. 3 and 4, or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of a control node for a distributed multiple-input multiple-output (D-MIMO) system comprising a plurality of access points, the method comprising, during a calibration process with over-the-air reference signaling between at least two of the plurality of access points, the calibration process comprising a plurality of reference signaling occasions, for at least one particular reference signaling occasion:

dynamically selecting, among the plurality of access points and based on information obtained by measurements performed during a previous reference signaling occasion, a first access point, the information obtained by measurements performed during the previous reference signaling occasion comprising one or more of:

a respective channel coherence time for the first access point relative to each of one or more other access points among the plurality of access points; and a respective reference signaling reliability for the first access point relative to each of one or more other access points among the plurality of access points, the respective reference signaling reliability for the first access point being based on signal strength measurements performed by the first access point; and controlling the first access point to act as a reference signal transmitter during the particular reference signaling occasion.

2. The method of claim 1, wherein the dynamically selected first access point and the reference signal transmitter of the previous reference signaling occasion form respective ends of a bi-directional link.

3. The method of claim 1, wherein the measurements performed during the previous reference signaling occasion comprises one or both of Doppler measurements and the signal strength measurements.

4. The method of claim 1, further comprising, for the at least one particular reference signaling occasion:

dynamically selecting, among the plurality of access points excluding the first access point, a second access point; and controlling the second access point to perform measurements during the particular reference signaling occasion.

5. The method of claim 4, further comprising informing the second access point that the first access point acts as the reference signal transmitter during the particular reference signaling occasion.

6. The method of claim 4, further comprising excluding a third access point from the dynamic selection of the second access point, responsive to one or more of:

that the information obtained by measurements performed during the previous reference signaling occasion indicates a signal transfer quality between the first access point and the third access point that falls on a side of a quality threshold that indicates low quality; and that channel transfer data is otherwise acquired during the calibration process for calibration of the first and third access points.

7. The method of claim 1, further comprising receiving, prior to a subsequent reference signaling occasion, information obtained by measurements performed during the particular reference signaling occasion.

8. The method of claim 1, wherein the dynamic selection of the first access point is further based on one or both of a system time parameter associated with a coherence assumption and a movement estimation obtained by a sensor co-located with the first access point.

9. The method of claim 1, wherein, when the information obtained by measurements performed during the previous reference signaling occasion comprises the respective channel coherence time for the first access point, the respective channel coherence time for the first access point is based on Doppler measurements performed by the first access point.

10. The method of claim 1, wherein, when the information obtained by measurements performed during the previous reference signaling occasion comprises the respective channel coherence time for the first access point, the dynamically selected first access point fulfills a coherence condition relative to the reference signal transmitter of the previous reference signaling occasion.

11. The method of claim 10, wherein the coherence condition comprises that a time interval between the previous reference signaling occasion and the particular reference signaling occasion is shorter than the respective channel coherence time for the first access point relative to the reference signal transmitter of the previous reference signaling occasion.

12. The method of claim 1, wherein, among the plurality of access points fulfilling a coherence condition at the particular reference signaling occasion, the dynamically selected first access point has a shortest time, at the particular reference signaling occasion, until the coherence condition is no longer fulfilled.

13. The method of claim 1, wherein, when the information obtained by measurements performed during the previous reference signaling occasion comprises the respective reference signaling reliability for the first access point, the dynamically selected first access point fulfills a reliability condition relative to the reference signal transmitter of the previous reference signaling occasion.

14. The method of claim 13, wherein the reliability condition comprises that a received signal strength metric for the reference signal transmitter of the previous reference signaling occasion, as obtained at the first access point, exceeds a signal strength metric threshold.

15. The method of claim 1, wherein each access point of the plurality of access points is selected as the first access point at least once during the calibration process.

16. The method of claim 1, further comprising:

determining an overall channel scenario status of the plurality of access points as stationary or variable; and performing the calibration process by dynamically selecting the first access point only when the overall channel scenario status is determined to be variable.

17. The method of claim 1, further comprising, after the plurality of reference signaling occasions, determining calibration coefficients for the plurality of access points based on channel transfer data acquired by measurements performed during the plurality of reference signaling occasions.

18. A non-transitory computer readable medium, having stored thereon a computer program comprising program instructions, the computer program being loadable into a data processing unit of a control node for a distributed multiple-input multiple-output (D-MIMO) system and the computer program configured to cause execution of a method when the computer program is run by the data processing unit, the method comprising, during a calibration process with over-the-air reference signaling between at least two of a plurality of access points, the calibration process comprising a plurality of reference signaling occasions, for at least one particular reference signaling occasion:

dynamically selecting, among the plurality of access points and based on information obtained by measurements performed during a previous reference signaling occasion, a first access point, the information obtained by measurements performed during the previous reference signaling occasion comprising one or more of:

a respective channel coherence time for the first access point relative to each of one or more other access points among the plurality of access points; and a respective reference signaling reliability for the first access point relative to each of one or more other access points among the plurality of access points, the respective reference signaling reliability for the first access point being based on signal strength measurements performed by the first access point; and controlling the first access point to act as a reference signal transmitter during the particular reference signaling occasion.

19. An apparatus for a control node for a distributed multiple-input multiple-output (D-MIMO) system comprising a plurality of access points, the apparatus comprising controlling circuitry configured to cause, during a calibration process with over-the-air reference signaling between at least two access points of the plurality of access points, the calibration process comprising a plurality of reference signaling occasions, for at least one particular reference signaling occasion:

dynamic selection, among the plurality of access points and based on information obtained by measurements performed during a previous reference signaling occasion, of a first access point, the information obtained by measurements performed during the previous reference signaling occasion comprising one or more of:

a respective channel coherence time for the first access point relative to each of one or more other access points among the plurality of access points; and a respective reference signaling reliability for the first access point relative to each of one or more other access points among the plurality of access points, the respective reference signaling reliability for the first access point is based on signal strength measurements performed by the first access point; and control of the first access point to act as a reference signal transmitter during the particular reference signaling occasion.

20. The apparatus of claim 19, wherein the dynamically selected first access point and the reference signal transmitter of the previous reference signaling occasion form respective ends of a bi-directional link.

* * * * *